United States Patent [19]

Leung

[11] Patent Number: 4,595,981

[45] Date of Patent: Jun. 17, 1986

[54] METHOD OF TESTING INTERFACES BETWEEN COMPUTER PROGRAM MODULES

[75] Inventor: Wu-Hon F. Leung, Downers Grove, Ill.

[73] Assignee: AT&T Bell Laboratories, Murray Hill, N.J.

[21] Appl. No.: 586,291

[22] Filed: Mar. 5, 1984

[51] Int. Cl.⁴ .............................................. G06F 9/06
[52] U.S. Cl. ...................................... 364/300; 371/19
[58] Field of Search ........................... 364/300; 371/19

[56] References Cited

U.S. PATENT DOCUMENTS 3,427,443  2/1969  Apple et al. ........................... 371/19

OTHER PUBLICATIONS

The book entitled, *The Art of Software Testing*, by Glenford J. Myers, (1979), pp. 56–73.

Primary Examiner—Raulfe B. Zache
Attorney, Agent, or Firm—Ross T. Watland

[57] ABSTRACT

A method of testing interfaces between computer program modules. The individual cause/effect charts of each of the modules are used to test the interfaces between the modules by executing the test cases in the charts in such manner that each test case need only be executed once. The variables passed between modules are monitored and compared with the input conditions in the charts.

18 Claims, 20 Drawing Figures

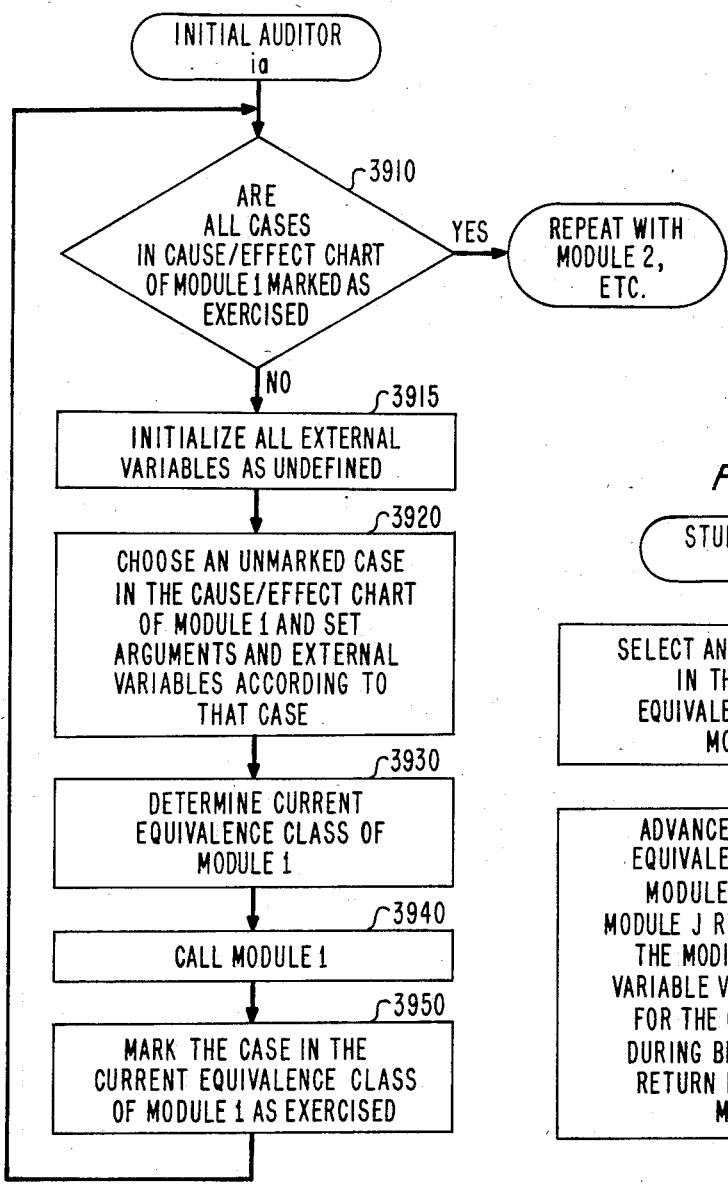

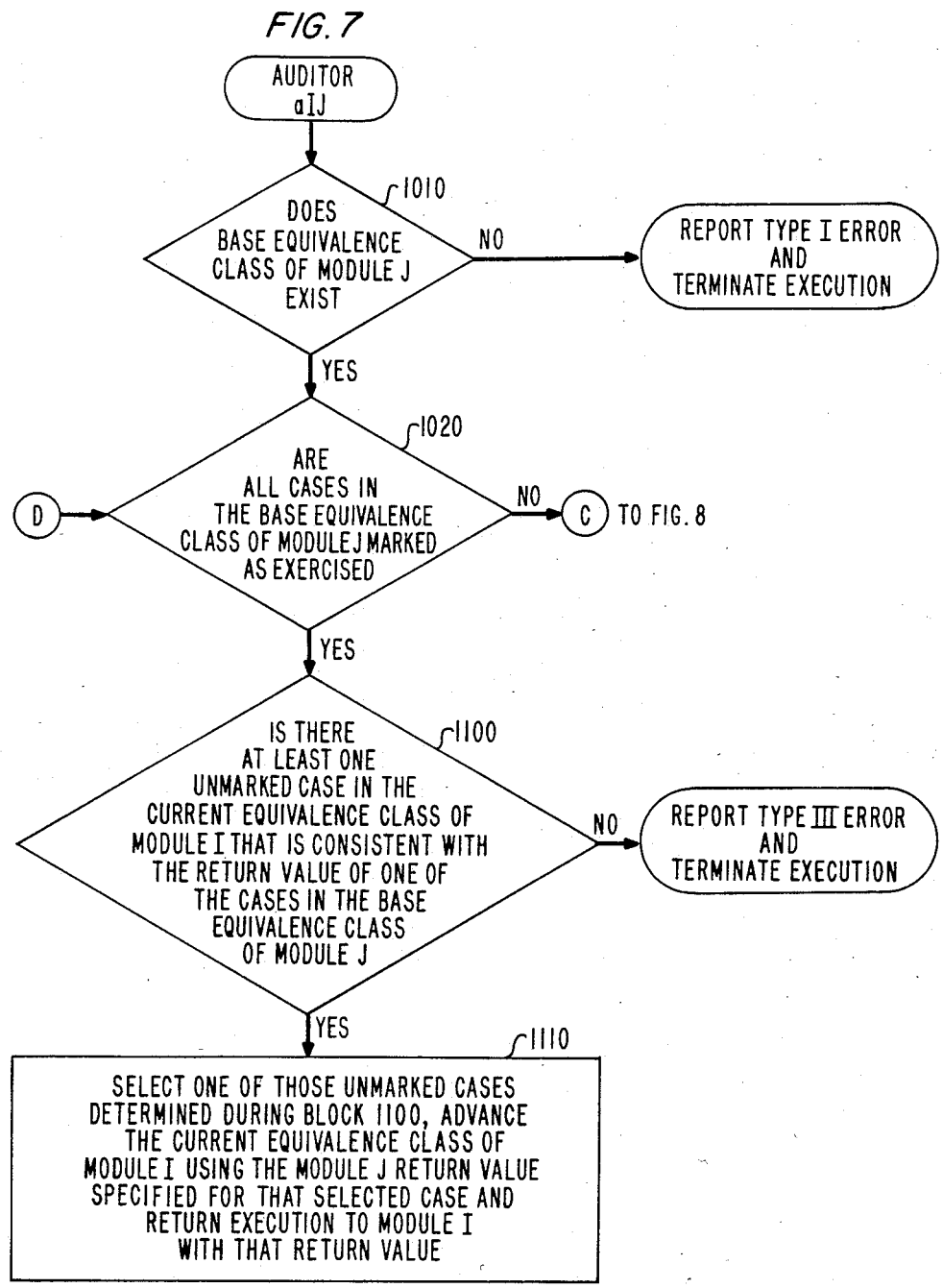

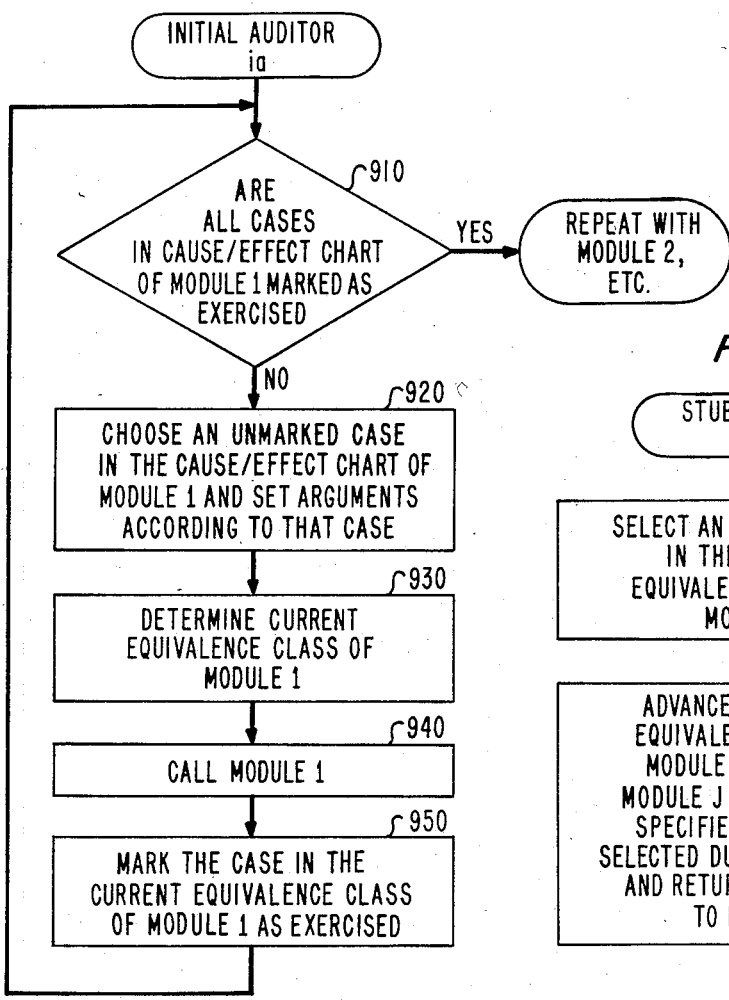

A-TABLE

| LIVE VARIABLE | MODULE | | | | | | | | |
|---|---|---|---|---|---|---|---|---|---|
| | X | | | Y | | | Z | | |
| m1 | 0 | 1 | 2 | 0 | 3 | 1 | 0 | 1 | 4 |
| m2 | 2 | 9 | 6 | 2 | 6 | 9 | 2 | 9 | 9 |
| m3 | 1 | 6 | 8 | 1 | 9 | 6 | 1 | 6 | 11 |

B-TABLE

| LIVE VARIABLE | ANTICIPATED VALUES | |
|---|---|---|
| m1 | 0 | 1 |
| m2 | 2 | 9 |
| m3 | 1 | 6 |

METHOD OF TESTING INTERFACES BETWEEN COMPUTER PROGRAM MODULES

TECHNICAL FIELD

This invention relates to methods of automatically testing computer programs and, more particularly, to such methods that make the automatic testing of large incrementally-developed programs practicable.

BACKGROUND OF THE INVENTION

One method of testing computer programs involves using a test specification called a cause/effect chart. The chart defines the expected program output condition for each of the possible program input conditions. Each input condition and its expected output condition comprise one test case in the cause/effect chart. A program is tested by executing the program once for each test case in the cause/effect chart and verifying that the expected output conditions are obtained for each input condition.

In developing large programs, it is frequently desirable to divide the development task by structuring the program as the integration of a number of program increments referred to herein as program modules. For example, a large program may comprise three program modules F1, F2 and F3. During the execution of module F1, module F2 is called which in turn calls module F3. When the execution of a called module is completed, execution of the calling module is resumed. Although it is desirable to test the program modules in accordance with individual cause/effect charts specified for each of the modules as they are developed, such testing does not assure that the overall program will operate as desired, particularly if the modules are developed by different individuals having inconsistent views of the requirements. Further, the preparation of a single cause/effect chart defining the overall requirements of a large program comprising many program modules may be extremely difficult and time-consuming. In addition, a different cause/effect chart would have to be prepared each time that testing is required as additional modules are completed and integrated during the development task. As a result, large programs are frequently tested only by operating them in their intended application for some period of time. Isolating and correcting the errors then may be expensive particularly if the errors affect the operation of an integrated system of which the program is only a part.

In view of the foregoing, a recognized problem in the art is the lack of a practicable method of automatically testing large, incrementally-developed computer programs and, in particular, testing the interfaces between the program modules that typically comprise such programs.

SUMMARY OF THE INVENTION

The aforementioned problem is solved and a technical advance is achieved in accordance with the principles of an illustrative method of the invention wherein the individual cause/effect charts of each of a number of integrated program modules are advantageously used to test the interfaces between the modules by executing the test cases in the charts in such manner that each test case need only be executed once and by monitoring the variables passed between modules and comparing them with the input conditions in the charts. The method is efficiently automated and the cost of integration testing is substantially reduced since it requires minimal programmer effort once the cause/effect charts for each of the program modules are initially prepared.

A digital computer is operated in accordance with the method of the invention to test an interface between a first program module and a second program module. Each of the first and second program modules has associated input variables and an associated cause/effect chart comprising a plurality of cases each having an input condition comprising values of input variables. In accordance with the method, the execution of the first program module is initiated but then suspended at a point where the first program module calls the second program module. A verification is then effected indicating that the values of those input variables associated with the second program module that are defined at the time the execution of the first program module is suspended, are consistent with the input condition of at least one of the cases of the cause/effect chart associated with the second program module. In accordance with a second aspect of the invention, the second program module is then executed. After the execution of the second program module is completed, a verification is effected indicating that the values of the input variables associated with the first program module that are then defined, are consistent with the input condition of at least one of the cases of the cause/effect chart associated with the first program module.

In accordance with one specific, illustrative method of the invention, the first and second program modules and their associated cause/effect charts are stored. The input variables associated with the first program module that are arguments and the input variables associated with the first program module that are external variables are initialized. Such initialization is in accordance with the input condition of a case that is marked as not exercised, of the cases of the stored cause/effect chart associated with the first program module. The execution of the first program module is initiated but then suspended at a point where the first program module calls the second program module. A verification is then effected indicating that the values of the input variables associated with the second program module that are defined at the time that the execution of the first program module is suspended, define a base equivalence class of cases in the stored cause/effect chart associated with the second program module. The values of input variables associated with the second program module that are external variables and of input variables associated with any program module transitively called by the second program module that are external variables, are then stored. The second program module is executed once for each case in the defined base equivalence class that is marked as not exercised, the input variables associated with the second program module being initialized in accordance with the input condition of that case. Upon completion of each execution of the second program module, a verification is effected indicating that the values of the input variables associated with the first program module that are then defined, are consistent with the input condition of at least one case in a current equivalence class of cases in the stored cause/effect chart associated with the first program module. That current equivalence class is defined by the values of the input variables associated with the first program module that are defined at the time that the execution of the first program module is suspended. The values of the input variables associated with the first program module that are defined upon completion of each execution of the second program module, are recorded. A case of the stored cause/effect chart associated with the second program module having an input condition that is consistent with the values of the input variables associated with the second program module as defined at the time of such completion, is marked as exercised and the previously stored external variable values are again assigned to the external variables. After all the cases in the defined base equivalence class have been marked as exercised, a verification is effected indicating that the input condition of at least one case in the defined current equivalence class that is marked as not exercised, is consistent with the values of the input variables associated with the first program module that were recorded following at least one of the executions of the second program module. One such case in the defined current equivalence class is then selected and the input variables associated with the first program module are assigned values consistent with the input condition of that selected case. The execution of the first program module is completed and a case of the stored cause/effect chart associated with the first program module is marked as exercised. The method is repeated until each case in the stored cause/effect chart associated with the first program module has been marked as exercised. In accordance with the method, it is sufficient to exercise each case in the cause/effect charts of the modules only once. Additional test executions will provide no additional information concerning the correctness of the interface between the modules. Furthermore, the number of test executions is proportional to the sum of the numbers of cases in the cause/effect charts of the modules rather than the product of the numbers of cases.

DRAWING DESCRIPTION

FIGS. 1 and 2, 5, and 6 are flow charts illustrating an exemplary test method in accordance with the invention wherein each case in the cause/effect charts of integrated program modules is exercised only once to efficiently test the interfaces between modules;

Figure 11:
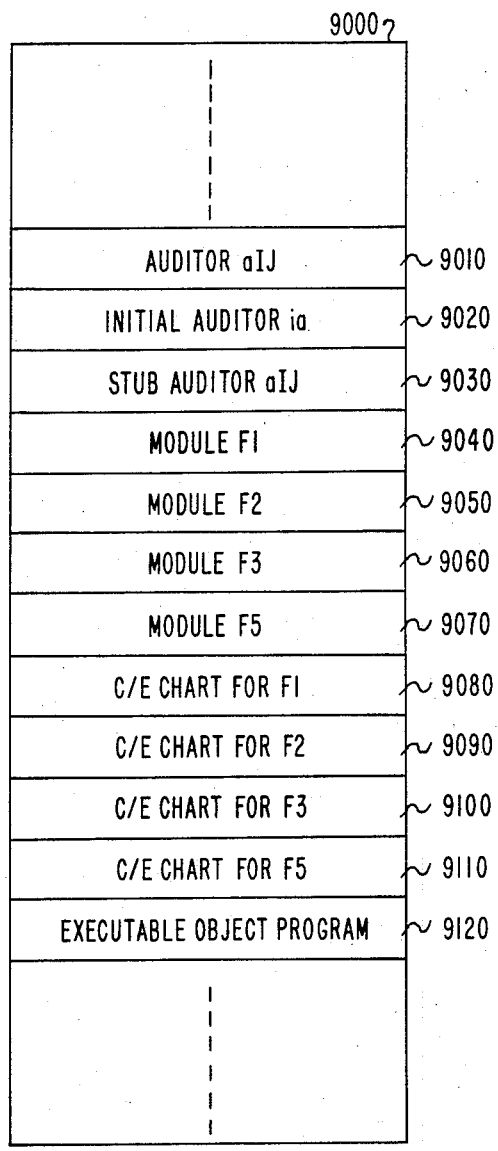
Figure 12:
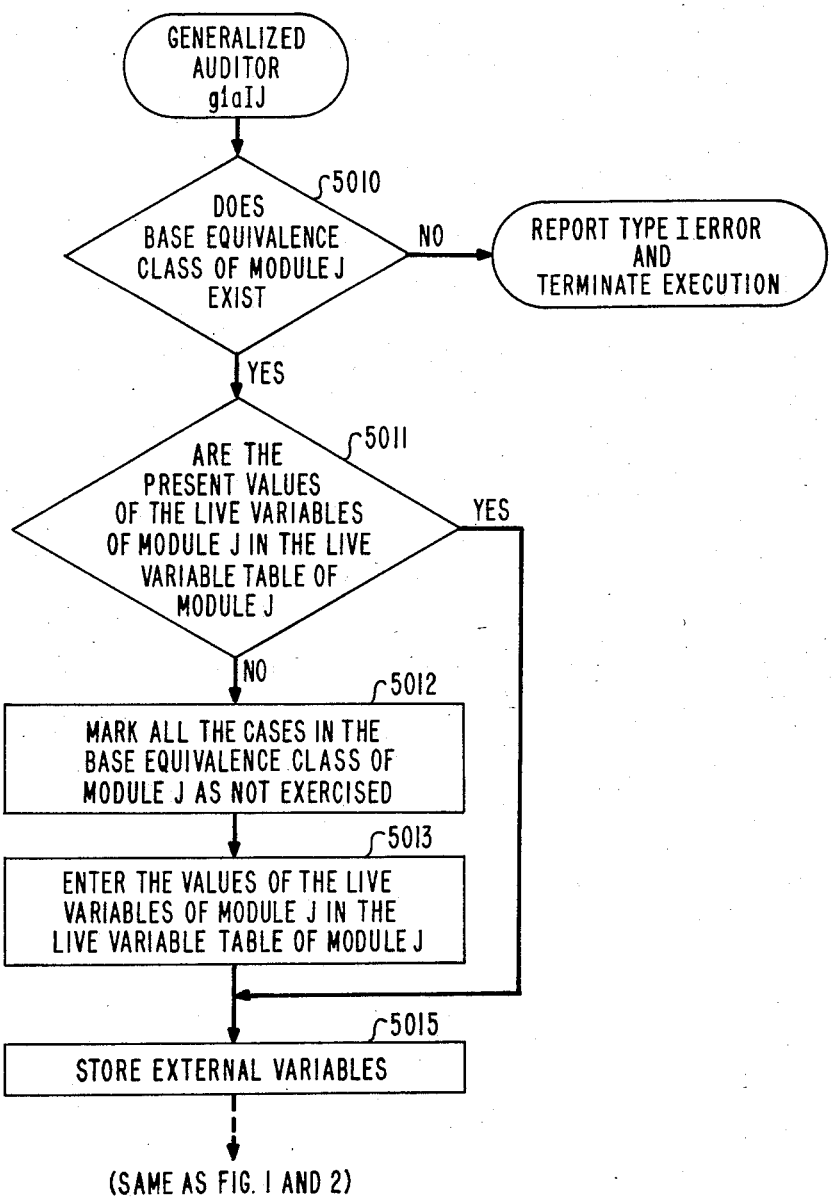
Figures 13, 14, 15:
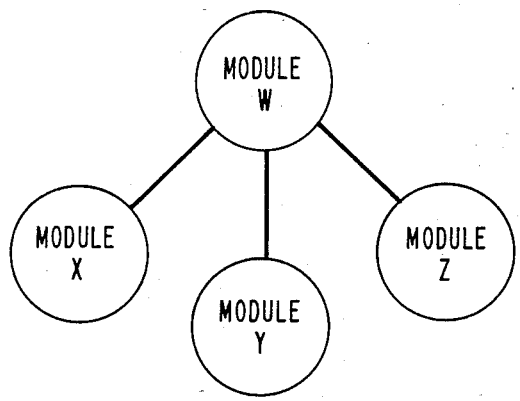

FIGS. 7 and 8, 9, and 10 are flow charts which are only slightly modified with respect to the flow charts of FIGS. 1 and 2, 5, and 6, respectively, to eliminate the reference to external variables and output tables;

FIG. 11 is a diagram of the exemplary organization of the workspace of a memory just prior to the beginning of testing in accordance with the method of the invention;

FIG. 12 and FIGS. 16 through 20 are flow charts illustrating two generalized methods of testing program module interfaces in accordance with the invention when the program modules have live variables; and FIGS. 13, 14 and 15 are diagrams used to describe the use of two tables in the generalized method of FIGS. 16 through 20.

DETAILED DESCRIPTION

Computer programs, or portions thereof referred to herein as program modules, can be tested using test specifications known as cause/effect charts. An exemplary program module F1, written in the C programming language, and its associated cause/effect chart are shown in Tables 1a and 1b.

TABLE 1a

```
RET
F1(a, b, c)
int a, b, c;
{
        RET    ret;
        ret = F3(b);
        if ( ret == SUCCESS )
            ret = F2(a, b, c);
        if ( ret == SUCCESS )
            return (SUCCESS);
        return (FAIL);
}
```

TABLE 1b

| | | F1 | | | |
|---|---|---|---|---|---|
| | case1 | case2 | case3 | case4 | case5 |
| a | ONE | ONE | ONE | ONE | ONE |
| b | ONE | ONE | TWO | TWO | TWO |
| c | ONE | ONE | THREE | THREE | THREE |
| F3 | FAIL | SUCCESS | FAIL | SUCCESS | SUCCESS |
| F2 | NA | FAIL | NA | FAIL | SUCCESS |
| Effect | F3( ); return(FAIL) | F3( ); F2( ); return (FAIL) | F3( ); return(FAIL) | F3( ); F2( ); return(FAIL) | F3( ); F2( ) return(SUCCESS) |

A cause/effect chart consists of rows and columns partitioned into two sections—an input specification and an output specification. In Table 1b, the input specification comprises that portion of the chart excluding the bottom row labelled Effect. That bottom row is the output specification. (Note that the chart is presented in two parts in Table 1b to limit the width of the chart.) The input specification defines the values of the input variables of the program module. The input variables can be of various types—for example, (1) arguments passed to the module, (2) external variables, i.e., variables that are known outside the module, (3) static internal variables, i.e., variables that are only known within the module but that are stored following each execution of the module to be used during a subsequent execution or (4) return values of other modules called by the module. In the cause/effect chart for module F1, the input variables are arguments a, b and c and the return values of two modules F3 and F2 called by module F1. Each column of the input specification comprises one input condition for the module. For each input condition in the chart there is an associated output condition located directly therebelow. An output condition includes a sequence of modules called by the module, the return value of the module and the values of external and static internal variables after the execution of the module.

Each input condition and its associated output condition comprises what is referred to as a case in the cause/effect chart. For example, in the cause/effect chart for module F1, case 1 comprises the input condition that the arguments a, b and c each have the value ONE and the return value from module F3 is FAIL, and the associated output condition that module F1 calls module F3 and that the module F1 return value is FAIL after execution. The designation NA in the chart means not applicable. The module F2 return value is not applicable in case 1 since module F2 is not called for that case. A cause/effect chart is domain complete if it includes all input variables of the module. Two cases in the cause/effect chart are redundant if they have identical input conditions. The cause/effect charts that are considered herein are domain complete and include only nonredundant cases.

An equivalence class is defined as a set of cases wherein the values of a subset of the input variables in the cause/effect chart are the same for each case. For example, in the cause/effect chart for module F1, given the arguments a, b and c, cases 1 and 2 comprise one equivalence class since in both cases each of the arguments a, b and c has the value ONE. Cases 3, 4 and 5 comprise another equivalence class since in each of those three cases, the arguments a, b and c have the values ONE, TWO and THREE, respectively. The set of cases determined by the values of those input variables that have been defined at the time that a program module is called, is referred to as the base equivalence class. As the module is executed, more of the input variables become defined, e.g., input variables that are return values of other modules or that are external variables modified by other modules. The set of cases determined by the values of all the input variables that have been defined at any given time during the execution of the module, is referred to as the current equivalence class. For example, when module F1 is called by some other module and passed the values of the arguments a, b and c all equal to ONE, the base equivalence class comprising cases 1 and 2 is defined. During the execution of module F1, module F3 is called and executed. After a module F3 return value of FAIL, for example, has been returned to module F1, the current equivalence class of module F1 is advanced to include only case 1 since case 2 specifies a module F3 return value of SUCCESS. It should be noted that after the values of all the input variables of a program module have been defined during its execution, the current equivalence class of the module comprises only one case. This is true because of the assumed domain completeness and nonredundancy of cases of the cause/effect charts.

A single program module is tested with respect to one case of its cause/effect chart by providing the module with the values of input variables in accordance with the input condition for that case and verifying that the resulting effects agree with the effects specified in the chart. A program module is said to be functionally correct if each case in the cause/effect chart is executed and in each case the specified effects are verified.

The interface between two program modules I and J is defined herein to be correct with respect to the cause/effect charts of modules I and J if and only if under every input condition wherein module I calls module J: (1) there exists a base equivalence class in the cause/effect chart of module J that is consistent with the values of the arguments and external variables at the time that module J is called and (2) after module J has been executed, there exists a case in the current equivalence class of module I that is consistent with the return value of module J and the values of the external variables that are modified by module J.

Figure 1:
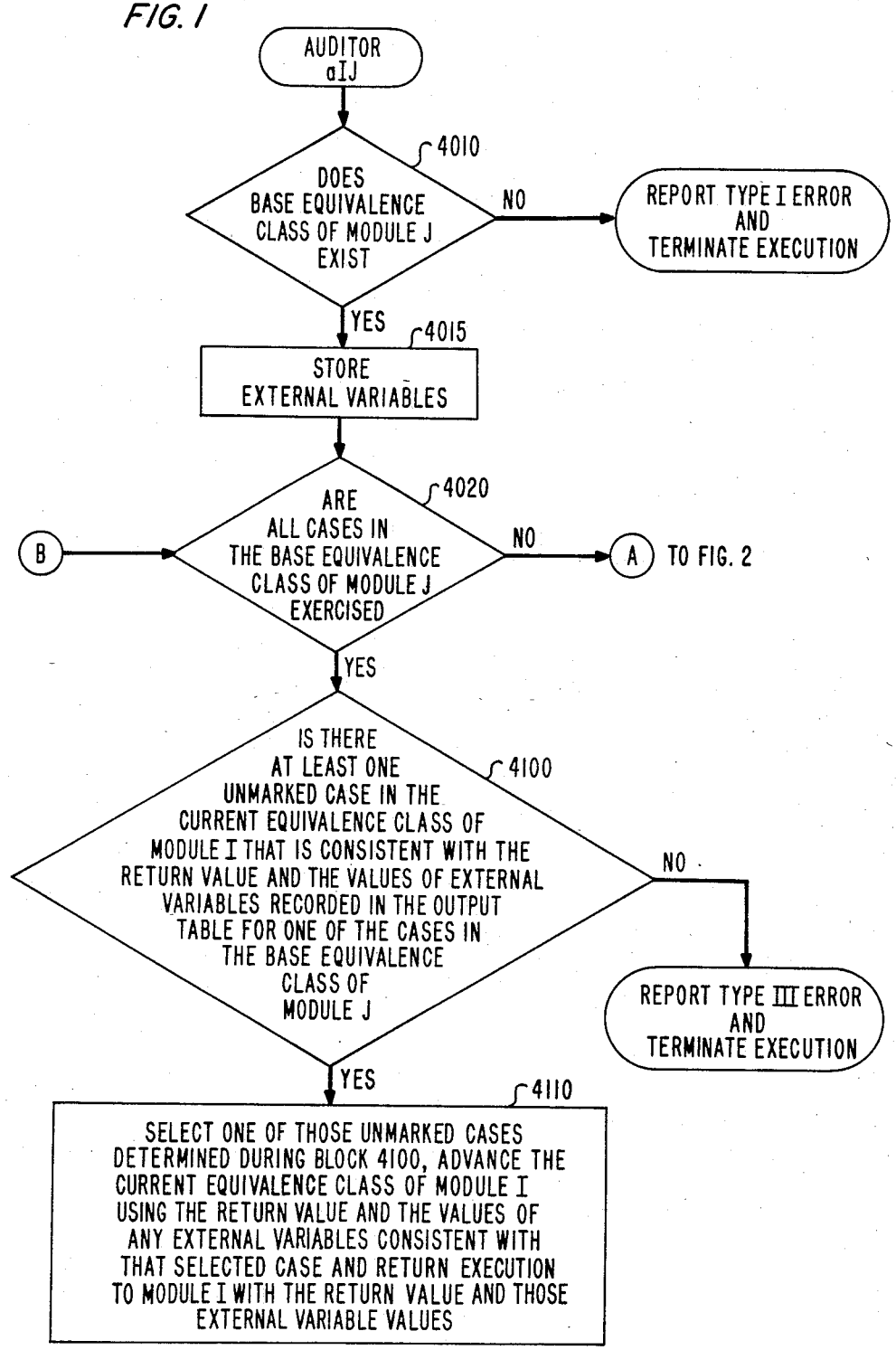
Figure 2:
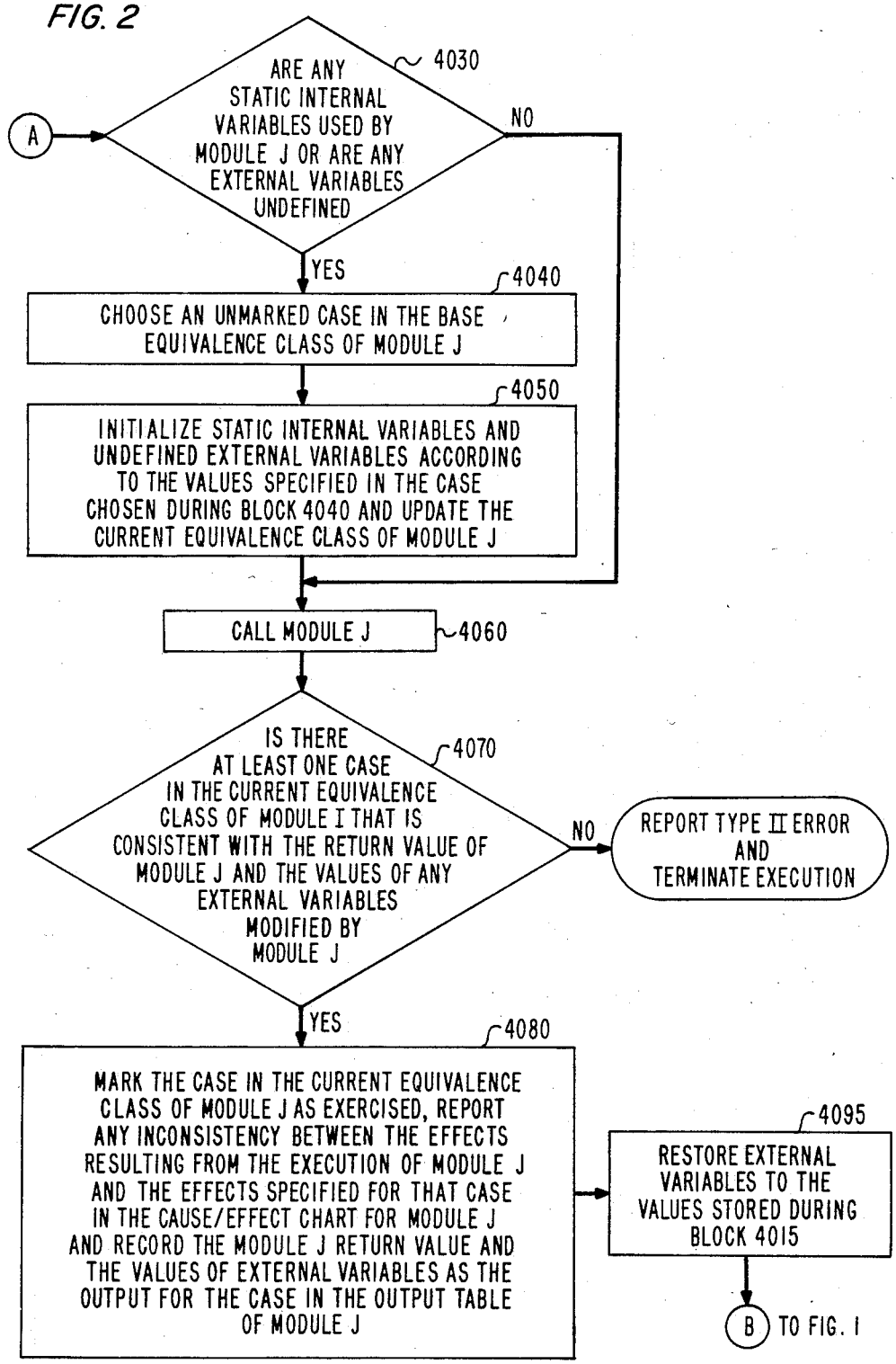

In accordance with the present invention, a program module referred to as an auditor is inserted between module I and module J. The auditor is used to verify the functional correctness of the calling module I and the interface correctness between the calling module I and the called module J. The flow chart for one exemplary auditor is shown in FIGS. 1 and 2. The auditor is executed once each time that module I calls module J. The auditor begins by determining, in block 4010, the base equivalence class of module J based on the values of the arguments and defined external variables at the time that module J is called. If no such base equivalence class exists, a Type I error is reported indicating that the interface between module I and module J is not correct and the test execution is terminated. However, if a base equivalence class does exist, execution proceeds to block 4015 and the values of the external variables are stored. This includes storing an indication of an undefined status for any external variables that are not yet defined. Execution proceeds to block 4020 and it is determined whether all of the cases in the base equivalence class of module J have been marked as exercised. Since block 4020 has not been executed before, none of the cases in the base equivalence class of module J have been marked as exercised. Therefore execution proceeds to block 4030. If module J uses any static internal variables or if any external variables remain undefined, execution proceeds via blocks 4040 and 4050 to block 4060. Otherwise, execution proceeds directly to block 4060. In block 4040, an unmarked case in the base equivalence class of module J is selected. Then in block 4050, the values specified for the case selected during block 4040 are used to initialize static internal variables and previously undefined external variables. Accordingly, when block 4060 is reached by either path, all static internal variables and external variables that are module J input variables have been defined. In block 4060, module J is called.

Module J is executed to completion and execution returns to block 4070 of the auditor. In block 4070, it is determined whether there is at least one case in the current equivalence class of module I that is consistent with the return value of module J and the values of any external variables modified by module J. If no such case exists in the current equivalence class of module I, a Type II error is reported indicating that the interface between module I and module J is incorrect and execution of the auditor is terminated. If at least one such case is found, however, execution continues to block 4080. Recall that once a program module has been executed to completion, there is only one case left in its current equivalence class. In block 4080, the one case remaining in the current equivalence class of module J is marked as exercised. Also during block 4080, any inconsistency between the effects resulting from the execution of module J and the effects specified for that case in the cause/effect chart of module J is reported. Such report indicates the functional incorrectness of the module J but not of the interface between modules I and J. An output table is stored for each program module. The output table lists, for each case in the cause/effect chart, the return value and the values of the external variables after the execution of that case. The recording of values in the output table of module J is effected during block 4080 and execution continues to block 4095, wherein the values of the external variables are all restored to the values stored in block 4015, including the indication of undefined status for any of the external variables that were undefined when block 4015 was executed. Execution is then returned to block 4020. In block 4020, it is again determined whether all of the cases in the base equivalence class of module J have been marked as exercised. The operation of the auditor is such that all the cases in the base equivalence class of module J are exercised before the execution of the auditor is completed. The sequence of blocks comprising blocks 4030, 4040, 4050, 4060, 4070, 4080 and 4095 is executed once for each case in the base equivalence class of module J. When all such cases have been marked as exercised, execution proceeds from block 4020 to block 4100. In block 4100, it is determined whether there is at least one unmarked case in the current equivalence class of module I that is consistent with the return value and the values of external variables recorded in the output table for one of the cases in the base equivalence class of module J. If no such unmarked case can be found in the current equivalence class of module I, a Type III error is reported indicating the incorrectness of the interface between module I and module J and execution of the auditor is terminated. Otherwise execution continues to block 4110 and one of the unmarked cases in the current equivalence class of module I that was determined during block 4100 is selected. The current equivalence class of module I is advanced using the module J return value and the values of external variables consistent with that selected case. Execution is then returned to the calling module I.

The above-described auditor program checks the interface between the calling module and the called module at three places. In block 4010, the auditor determines whether a base equivalence class for the called module can be found using the input variables of the called module that are known at the time. In block 4070, whenever an execution of the called module is completed, the auditor determines whether the calling module input variables that are determined by the execution of the called module are consistent with the values of those variables specified in at least one case in the current equivalence class of the calling module. Just before the auditor program returns execution to the calling module it updates the current equivalence class of that module. However, before such updating, the auditor program determines whether the input variables specified for at least one unmarked case in the current equivalence class of the calling module are consistent with the values recorded in the output table for at least one case in the base equivalence class of the called module. This determination is made in block 4100.

Of course, in many instances a single large program comprises a number of individual program modules. For example, consider a large program which includes in part five program modules F1, F2, F3, F4 and F5 (see FIG. 3). The program and associated cause/effect chart for module F1 is given in Tables 1a and 1b. The programs and associated cause/effect charts for modules F2, F3 and F5 are given in Tables 2a, 2b, 3a, 3b, 4a and 4b.

TABLE 2a

```
RET
F2 (a, b, c)
int  a, b, c;
{
        if ( a == ONE )
        if ( b == TWO )
        if ( c == THREE )
        return (SUCCESS);
        return (FAIL);
}
```

TABLE 2b

|  | | case1 | case2 | case3 | case4 | case5 |
|---|---|---|---|---|---|---|
|  | | | | F2 | | |
| a | | ONE | ONE | ONE | TWO | THREE |
| b | | TWO | ONE | THREE | * | * |
| c | | THREE | * | * | * | * |
| Effect | | return(SUCCESS) | return(FAIL) | return(FAIL) | return(FAIL) | return(FAIL) |

TABLE 3a

```
RET
F3(b)
int     b;
{       RET    ret;
        static int              i3 = 0;
        if ( b >= TWO ) {
             b = TWO;
        } else {
             b = ONE;
        }
        if ( i3 == 0 ) {
             F5 (b);
             i3 = 1;
        } else {
             i3 = 0;
        }
        ret = F4( );
        if ( ret == SUCCESS ) return (SUCCESS);
        return ( FAIL );
}
```

TABLE 3b

|  | case1 | case2 | case3 | case4 | case5 | case6 |
|---|---|---|---|---|---|---|
|  | | | F3 | | | |
| i3 | 0 | 0 | 1 | 1 | 0 | 0 |
| b | ONE | ONE | ONE | TWO | TWO | TWO |
| F5 | SUCCESS | SUCCESS | NA | NA | SUCCESS | SUCCESS |
| F4 | SUCCESS | FAIL | SUCCESS | FAIL | SUCCESS | FAIL |
| Effect | F5( ); | F5( ); | F4( ); | F4( ); | F5( ); | F5( ); |
|  | F4( ); | F4( ); | i3=0; | i3=0; | F4( ); | F4( ); |
|  | i3=1; | i3=1; | return (SUCCESS) | return(FAIL) | i3=1; | i3=1; |
|  | return (SUCCESS) | return (FAIL) | | | return(SUCCESS) | return(FAIL) |

TABLE 4a

```
F5(b)
int     b;
{       static int    i5 = 0;
        while ( b < THREE ) {
            b++;
            if ( i5 ==0 ) {
                i5 = 1;
            } else {
                if ( i5 == 1 ) {
                    i5 = 2;
                } else {
                    if ( i5 == 2 ) {
                        i5 = 0;
                    }
                }
            }
        }
}
```

TABLE 4b

| | F5 | | | |
| --- | --- | --- | --- | --- |
| | case1 | case2 | case3 | case4 |
| i5 | 0 | 1 | 2 | 0 |
| b | ONE | ONE | ONE | TWO |
| Effect | i5=2; | i5=0; | i5=1 | i5=1; |
| | return(SUCCESS) | return(SUCCESS) | return(SUCCESS) | return(SUCCESS) |

| | F5 | | |
| --- | --- | --- | --- |
| | case5 | case6 | case7 |
| i5 | 1 | 2 | 0 |
| b | TWO | TWO | THREE |
| Effect | i5=2; | i5=0; | i5=0; |
| | return(SUCCESS) | return(SUCCESS) | return(SUCCESS) |

Figure 3:
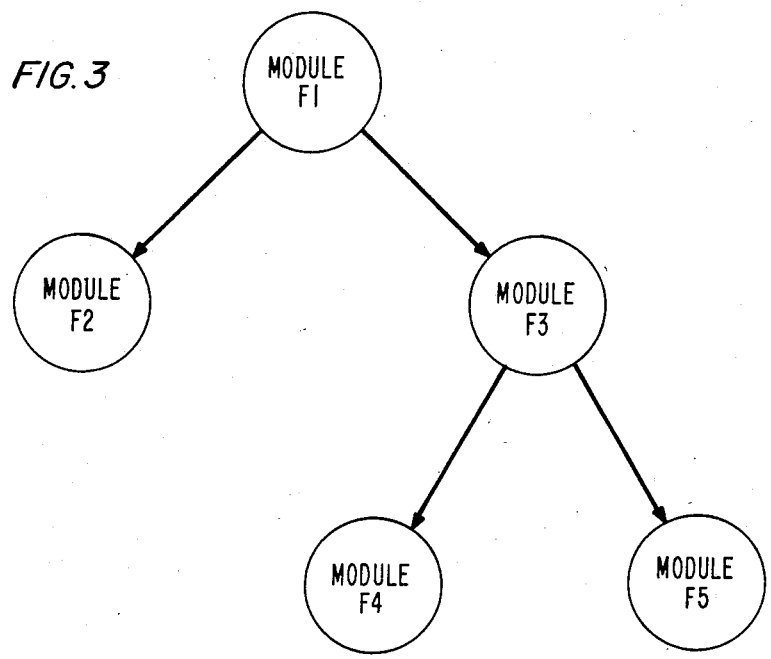
FIG. 3 is a diagram of the relationship of a number of integrated program modules used in an example to illustrate the present invention.
Figure 4:
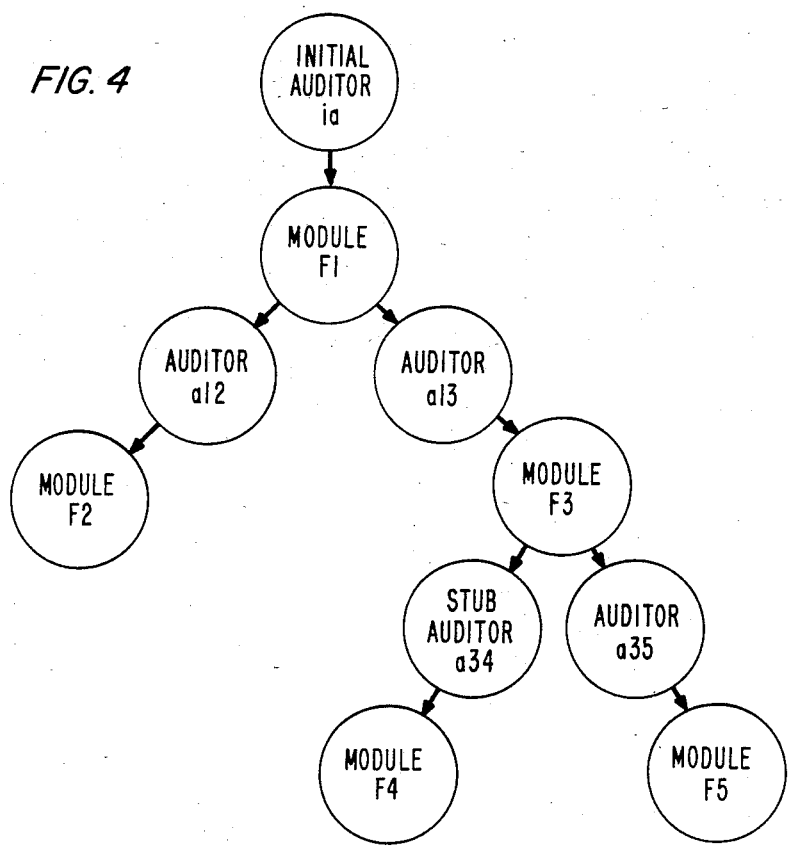
FIG. 4 is a diagram of the relationship among the integrated program modules of FIG. 3 after auditor programs are inserted to test the interfaces between the modules in accordance with the invention.

(The designation * in the cause/effect chart of Table 2b indicates that the input variables can take on any value.) At the time testing is desired, program module F4 has not been completed. Therefore, module F4 in FIG. 3 represents a stub. In accordance with the method of the invention, auditors are inserted as shown in FIG. 4. An initial auditor ia is inserted before the execution of module F1 to drive the testing. Auditors a12, a13 and a35 are inserted between modules 1 and 2, 1 and 3, and 3 and 5, respectively, and each represents the auditor program described above and shown in FIGS. 1 and 2. A stub auditor a34 is inserted between module F3 and the stub module F4.

The flow chart for the initial auditor ia, inserted before module F1, is shown in FIG. 5. Execution begins with block 3910 where it is determined whether all the cases in the cause/effect chart of module 1, i.e., the highest level module to be tested, have been exercised. Of course, initially none of the cases in the cause/effect chart of module 1 have been exercised. Therefore, execution continues to block 3915 wherein all external variables are initialized as undefined. In block 3920, one of the unmarked cases of module 1 is chosen and the arguments and external variables are set in accordance with the values specified in that chosen case. The current equivalence class of module 1 based on the values of the input variables specified thus far is determined in block 3930. Then, in block 3940, module 1 is called. Module 1 executes to completion and execution returns to block 3950 of initial auditor ia. Recall that once a called module is completely executed, there is only one case in its current equivalence class. The case in the current equivalence class of module 1 is marked as exercised in block 3950 and execution proceeds back to block 3910. The sequence of blocks 3915, 3920, 3930, 3940 and 3950 is executed once for each case in the cause/effect chart of module 1. Then the entire procedure is repeated for modules 2, 3 etc.

The flow chart for the stub auditor aIJ, inserted between module F3 and the stub module F4, is shown in FIG. 6. The stub auditor performs necessary steps that are consistent with the assumption that the interface between modules F3 and F4 is correct. Execution begins with block 4210 wherein an unmarked case in the current equivalence class of module I is selected. Then in block 4220, the current equivalence class of module I is advanced using the module J return value and the modified external variable values specified for the selected case and execution is returned to module I.

FIG. 11 is a diagram of the exemplary organization of the work space of a memory 9000 just prior to the beginning of testing. Blocks 9010, 9020, and 9030 contain the programs for the auditors described by the flow charts of FIGS. 1 and 2, 5, and 6. The initial auditor program ia is modified to reference module F1 as the highest level module to be tested. Blocks 9040, 9050, 9060 and 9070 contain the programs for modules F1, F2, F3 and F5, respectively. Blocks 9080, 9090, 9100 and 9110 contain the cause/effect charts for those four program modules. The programs of modules F1, F2, F3 and F5 are modified such that the references to called modules are replaced by references to the appropriate auditor programs. This is accomplished using the #define preprocessing facility in the C language. Block 9120 contains the executable object program to be run by a processor.

The use of the method of the invention to test a large program representing the integration of a number of program modules such as those of FIG. 3 will be better understood by a consideration of the detailed example described herein. First, however a number of important properties of the method of the present invention are noted: (1) the test executions generated in accordance with the method are all valid test executions, i.e., every program module involved is executed as though there were no auditor intervention, (2) no additional test executions will provide any additional information about the correctness of the modules and the interfaces between them, i.e., it is sufficient to exercise each case in the cause/effect charts of the modules only once, (3) if each module completes execution for each case in its cause/effect chart, each auditor will return to its calling module and (4) only a finite number of test executions are required and that finite number is proportional to the sum of the numbers of cases in the cause/effect charts of the modules rather than the product of the numbers of cases. The fourth property is very important since it is because of this property that the method of the invention remains practical for testing very large programs with many program modules and variables and very extensive cause/effect charts. The above-described properties are true for the exemplary auditor programs of FIGS. 1 and 2, 5, and 6 unless external variables referred to as live variables are involved. The definition of live variables and generalized auditor programs that can be used when such variables are present are given later herein.

EXAMPLE OF INTEGRATION TESTING

The integration of the program modules F1, F2, F3, F4 and F5 defined above, is tested in accordance with an exemplary method of the invention by inserting auditor programs as shown in FIG. 4. Since the program modules in this example include no external variables, the example is described with reference to the flow charts of FIGS. 7 and 8, 9, and 10 which are only slightly modified with respect to the flow charts of FIGS. 1 and 2, 5, and 6, respectively, to eliminate the reference to external variables and output tables. In the description which follows, the designation of an auditor, e.g., a35.2, indicates the calling and called module between which the auditor is inserted and also differentiates between the different times that that auditor is called. For example, the first time the auditor between module 3 and 5 is called, it is designated a35.0, the second time a35.1, etc. With the exception of the initial auditor ia and the stub auditor a34, each of the auditors shown in FIG. 4 has the same program. The flow chart for that program is the flow chart of FIGS. 7 and 8.

Execution begins with block 910 of the initial auditor ia.0 (FIG. 9). Since none of the cases in the cause/effect chart of module F1 have been exercised, execution proceeds to block 920 during which case 1 of module F1 is selected and the arguments a, b and c are all set equal to ONE in accordance with the cause/effect chart (Table 1b). During block 930 it is determined that the current equivalence class of module F1 comprises cases 1 and 2, since in both of those cases the arguments a, b and c are all set equal to ONE. During block 940, the initial auditor ia.0 calls module F1.

Module F1 (Table 1a) is executed up to the point that module F3 is called and passed the argument b with a value of ONE. However, in accordance with the method of the invention, the auditor a13.0 is called rather than the module F3.

Execution of auditor a13.0 (FIGS. 7 and 8) begins with block 1010 during which it is determined that a base equivalence class of module F3 in fact exists and comprises cases 1, 2 and 3 of module F3 since in those cases the argument b has the value ONE (Table 3b). During block 1020, it is determined that none of the cases in that base equivalence class of module F3 have been marked as exercised. Therefore, execution proceeds to block 1030 and, since module F3 uses the static internal variable i3, then proceeds to block 1040. During block 1040, the unmarked case 1 of module F3 is chosen. In block 1050, the static internal variable i3 is initialized to 0 in accordance with case 1 of module F3 and the current equivalence class of module F3 is updated to comprise cases 1 and 2 since only those cases of the base equivalence class have the static internal variable i3 equal to 0. Execution proceeds to block 1060 and module F3 is called.

Execution of module F3 (Table 3a) begins and since the value ONE was passed to module F3 as the argument b, the result of the first if statement of module F3 is that b remains ONE. Since the static internal variable i3 is equal to 0, module F5 is called and passed the argument b equal to ONE. In accordance with the method of the invention, the auditor a35.0 is called rather module F5.

Execution of auditor a35.0 (FIGS. 7 and 8) begins with block 1010, during which the base equivalence class of module F5 comprising cases 1, 2 and 3 is determined since in those cases the argument b has the value ONE (Table 4b). Since in block 1020 it is determined that none of the cases in the base equivalence class of module F5 are marked as exercised, block 1030 is subsequently executed. Since the static internal variable i5 is used in module F5, execution proceeds to block 1040 and case 1 of module F5 is selected. During block 1050, the static internal variable i5 is initialized to 0 in accordance with case 1 of module F5 and the current equivalence class of module F5 is updated as including only case 1 since cases 2 and 3 do not have the static internal variable i5 equal to 0. Then, in block 1060, module F5 is called.

Module F5 (Table 4a) is then executed to completion. Since module F5 was passed the value ONE as the argument b and the static internal variable i5 was initialized to 0, b is incremented twice to become THREE and the final value of i5 is 2 in accordance with the program. The return value of module F5 is SUCCESS. Execution is returned to the calling auditor a35.0.

Execution of auditor a35.0 (FIGS. 7 and 8) resumes with block 1070. Recall that the current equivalence class of module F3 comprises cases 1 and 2. During block 1070, it is determined whether at least one of the cases 1 and 2 of module F3 is consistent with the return value SUCCESS of module F5. In the present example, both cases 1 and 2 of module F3 have the return value SUCCESS for the module F5. Therefore, block 1080 is executed and case 1 of module F5 is marked as exercised. Since the expected effects for case 1 of module F5—namely, a final value of 2 for the static internal variable i5 and a return value of SUCCESS—do, in fact, occur, no inconsistencies need to be reported in block 1080. Execution proceeds back to block 1020 and, since cases 2 and 3 of the base equivalence class of module F5 have not yet been exercised, execution then proceeds to block 1030. Since module F5 uses the static internal variable i5, blocks 1040 and 1050 are executed. Case 2 of module F5 is selected during block 1040. The static internal variable i5 is initialized to 1 and the current equivalence class of module F5 is updated as including only case 2 during block 1050. Then during block 1060, module F5 is called for the second time.

Again during the execution of module F5 (Table 4a), b is incremented twice to become THREE. The final value of i5 is 0 and the return value is again SUCCESS. Module F5 again returns execution to the calling auditor a35.0.

Execution of auditor a35.0 (FIGS. 7 and 8) resumes with block 1070. As before the return value SUCCESS for module F5 is consistent with both the cases 1 and 2 in the current equivalence class of module F3 and execution proceeds to block 1080. In block 1080, case 2 of module F5 is marked as exercised and no inconsistences are reported since the effects of case 2 of module F5 are consistent with the cause/effect chart. Execution proceeds back to block 1020 and blocks 1020, 1030, 1040, 1050 and 1060 of auditor a35.0 are executed. This time case 3 of module F5 is selected during block 1040.

Module F5 (Table 4a) is executed for the third time, this time having its static internal variable i5 equal to 2 and again having the argument b equal to ONE.

Execution is returned to block 1070 of auditor a35.0 (FIGS. 7 and 8) and since the return value of SUCCESS for module F5 is consistent with cases 1 and 2 of module F3, execution continues with block 1080. During block 1080, case 3 of module F5 is marked as exercised and execution proceeds back to block 1020. This time, however, all the cases in the base equivalence class of module F5—namely, cases 1, 2 and 3—have been exercised and execution proceeds to block 1100. In block 1100, it is determined whether there is at least one unmarked case in the current equivalence class of module F3 that is consistent with the return value of one of the cases in the base equivalence class of module F5. In the present example, the unmarked cases 1 and 2 in the current equivalence class of module F3 are both consistent with the return value of SUCCESS resulting from each of the three cases 1, 2 and 3 in the base equivalence class of module F5. Accordingly, execution proceeds to block 1110. In block 1110, one of the unmarked cases determined during block 1100, in the present example case 1 of module F3, is selected. The current equivalence class of module F3 is not changed in block 1110 since both cases 1 and 2 of module F3 specify an F5 return value of SUCCESS. Execution is then returned to module F3 with the F5 return value of SUCCESS.

Execution of module F3 (Table 3a) resumes immediately following its call of module F5 and the internal static variable i3 is set equal to 1. Then module F4 is called. Since in the present example, module F4 is a stub, the stub auditor a34.0 (FIG. 10) is called.

During block 1210 of stub auditor a34.0, the unmarked case 1 in the current equivalence class of module F3 is selected. In block 1220, the current equivalence class of module F3 is advanced to include only case 1 in accordance with the F4 return value of SUCCESS specified for the case selected in block 1210 and execution is returned to module F3.

The execution of module F3 (Table 3a) resumes immediately following its call of module F4. In accordance with the program, the execution of module F3 is completed with a return value of SUCCESS and execution is returned to the calling auditor a13.0.

The execution of auditor a13.0 (FIGS. 7 and 8) resumes with block 1070. Recall that the current equivalence class of module F1 comprises cases 1 and 2. Since a module F3 return value of SUCCESS is consistent with case 2 of module F1, execution proceeds to block 1080, during which case 1 of module F3 is marked as exercised. Execution then proceeds back to block 1020. Recall that the base equivalence class of module F3 includes cases 1, 2 and 3. Since cases 2 and 3 have not been exercised, execution proceeds through blocks 1040, 1050 and 1060, with case 2 being chosen in block 1040 and with the static internal variable i3 being initialized as 0 and the current equivalence class of module F3 being updated to include only cases 1 and 2 in block 1050. In block 1060, module F3 is called.

Since the static internal variable i3 is initialized as 0, module F3 (Table 3a) is executed up until the point that module F5 is called and passed the argument b equal to ONE. In accordance with the method of the invention, auditor a35.1 is called rather than module F5.

Execution of auditor a35.1 (FIGS. 7 and 8) begins with block 1010, during which it is determined that the base equivalence class of module F5 includes cases 1, 2 and 3 since b has the value ONE (Table 4b). Since all the cases 1, 2 and 3 in the base equivalence class of module F5 are marked as exercised, those cases need not be executed again and execution of auditor a35.1 continues with block 1100. Since the module F5 return value of SUCCESS, which is the specified effect for each of the cases in the base equivalence class of module F5, is consistent with the unmarked case 2 in the current equivalence class of module F3, execution proceeds to block 1110. Case 2 of module F3 is selected in block 1110. However, the current equivalence class of module F3 is unchanged since both cases 1 and 2 of module 3 specify a module F5 return value of SUCCESS. Execution then returns to module F3 with a module F5 return value of SUCCESS.

The execution of module F3 (Table 3a) resumes from the point that module F5 is called. The static internal variable i3 is set equal to 1 and then module F4 is called. In accordance with the method of the invention, the stub auditor a34.1 (FIG. 10) is called rather than module F4.

During block 1210 of stub auditor a34.1, the unmarked case 2 of module F3 is selected. The module F4 return value of FAIL specified for case 2 of module F3 is used to advance the current equivalence class of module F3 to include only case 2 during block 1220 and execution is returned to module F3.

The execution of module F3 (Table 3a) is completed and since the return value of module F4 was FAIL, the return value of module F3 is also FAIL in accordance with the program of module F3. Execution returns to the calling auditor a13.0.

The execution of auditor a13.0 (FIG. 7 and 8) resumes with block 1070. Since the case 1 in the current equivalence class of module F1 is consistent with a module F3 return value of FAIL, execution proceeds to block 1080. Case 2 of module F3 is marked as exercised and execution proceeds back to block 1020. Since case 3 in the base equivalence class of module F3 is not marked as exercised, blocks 1030, 1040, 1050 and 1060 are executed. Case 3 of module F3 is chosen in block 1040. In block 1050, the static internal variable i3 is initialized to 1 in accordance with case 3 and the current equivalence class of module F3 is updated to include only case 3 since cases 1 and 2 both specify i3 values of 0. In block 1060, module F3 is called.

Module F3 (Table 3a) begins execution and since the static internal variable i3 was initialized to 1, the value of the variable i3 is changed to 0 in accordance with the program. Execution continues up to the point that module F4 is called. The stub auditor a34.2 (FIG. 10) is called rather than module F4.

Unmarked case 3 of module F3, being the only case in the current equivalence class of module F3, is selected during block 1210 of stub auditor a34.2. A module F4 return value of SUCCESS is specified in case 3 of module F3. The current equivalence class of module F3 cannot be further advanced in block 1220 and execution returns to module F3 with a module F4 return value of SUCCESS.

The execution of module F3 (Table 3a) resumes and is completed with a return value of SUCCESS in accordance with the program of module F3. Execution then returns to the calling auditor a13.0.

The execution of auditor a13.0 (FIGS. 7 and 8) resumes with block 1070. The module F3 return value of SUCCESS is consistent with the case 2 of the current equivalence class of module F1. Therefore, execution proceeds to block 1080 wherein case 3 of module F3 is marked as exercised. Execution then proceeds back to block 1020. This time all the cases 1, 2 and 3 in the base equivalence class of module F3 have been marked as exercised. Therefore execution branches to block 1100 during which it is determined that unmarked case 1 of module F1 is consistent with an F3 return value of FAIL as in case 2 of the base equivalence class of module F3, and that unmarked case 2 of module F1 is consistent with an F3 return value of SUCCESS as in cases 1 and 3 of the base equivalence class of module F3. Execution proceeds to block 1110 and, in accordance with the present example, unmarked case 1 of module F1 is selected and the current equivalence class of module F1 is advanced to include only case 1. Execution is returned to module F1 with a module F3 return value of FAIL.

The execution of module F1 (Table 1a) is completed in accordance with its program resulting in an F1 return value of FAIL, which agrees with the effect specified for case 1 of module F1 in the cause/effect chart. Execution is then returned to the initial auditor ia.0.

Case 1 of module F1 is marked as exercised in block 950 of initial auditor ia.0 (FIG. 9) and execution proceeds back to block 910. Since, cases 2 through 5 of module F1 have not been marked as exercised, execution continues with block 920, wherein case 2 of module F1 is selected and the arguments a, b and c are all set equal to ONE in accordance with that case. In block 930, the current equivalence class of module F1 comprising cases 1 and 2 as before is determined and during block 940 module F1 is called.

Module F1 (Table 1a) is executed until the point that module F3 is called with the argument b equal to ONE. Auditor a13.1 is called rather than module F3.

Execution of auditor a13.1 (FIGS. 7 and 8) begins with block 1010 wherein the base equivalence class of module F3 comprising cases 1, 2 and 3 is determined. Since all three of those cases have already been marked as exercised they need not be reexecuted. Rather execution proceeds from block 1020 to block 1100. Since in block 1100 it is determined that unmarked case 2 in the current equivalence class of module F1 is consistent with the module F3 return value of SUCCESS as in cases 1 and 3 of the base equivalence class of module F3, execution proceeds to block 1110. In block 1110 the current equivalence class of module F1 is advanced to include only case 2 and execution is returned to module F1 with a module F3 return value of SUCCESS.

The execution of module F1 (Table 1a) then continues up to the point that module F2 is called and passed the arguments a, b and c all having the value ONE. The auditor a12.0 is called rather than module F2.

The execution of auditor a12.0 (FIGS. 7 and 8) begins with block 1010 wherein the base equivalence class of module F2, comprising only case 2 since the values of both a and b are ONE, is determined (Table 2b). Since that case has not been marked as exercised, execution proceeds from block 1020 to block 1030. Module F2 includes no static internal variables. Therefore execution proceeds directly to block 1060 and module F2 is called.

Module F2 (Table 2a) is then executed completely. Since the passed arguments a, b and c were all equal to ONE, the return value of module F2 is FAIL in accordance with its program. Execution is returned to the calling auditor a12.0.

The execution of auditor a12.0 (FIGS. 7 and 8) resumes with block 1070 wherein it is determined that the only case in the current equivalence class of module F1, namely, case 2, is consistent with a module F2 return value of FAIL. Accordingly, execution proceeds to block 1080 and case 2 of module F2 is marked as exercised. Execution then proceeds back to block 1020 and since the only case in the base equivalence class of module 2 was just marked as exercised, execution branches to block 1100. In block 1100, it is determined that the unmarked case 2 in the current equivalence class of module F1 is consistent with the module F2 return value of FAIL as in case 2, the only case in the base equivalence class of module F2. In block 1110, the current equivalence class of module F1 is not advanced since it already only includes the one case, case 2, and execution is returned to module F1 with a module F2 return value of FAIL.

The execution of module F1 (Table 1a) is then completed with a return value of FAIL in accordance with the program and as specified in the effect for case 2 of the cause/effect chart of module F1. Execution then returns the calling initial auditor ia.0.

In block 950 of initial auditor ia.0, (FIG. 9), the case 2 in the current equivalence class of module F1 is marked as exercised and execution proceeds back to block 910. Since cases 3, 4 and 5 of module F1 have not yet been exercised, execution continues to block 920 wherein case 3 of module F1 is selected and the arguments a, b and c are set to the values ONE, TWO and THREE, respectively. In block 930, the current equivalence class of module F1 comprising cases 3, 4 and 5 thereof based on the values of the arguments a, b and c, is determined and, in block 940, module F1 is called.

Module F1 (Table 1a) is executed up to the point that module F3 is called with the value of the argument b equal to TWO. Auditor a13.2 is called rather than module F3.

Execution of auditor a13.2 (FIGS. 7 and 8) begins with block 1010 wherein the base equivalence class of module F3 comprising cases 4, 5 and 6 based on the passed value of TWO for the argument b, is determined (Table 3b). Since none of the cases 4, 5 and 6 is marked as exercised, execution branches from block 1020 to block 1030 and, since module F3 uses the static internal variable i3, execution proceeds to block 1040. In block 1040, the unmarked case 4 of module F3 is selected. In block 1050, the static internal variable i3 is initialized to have a value of 1 and the current equivalence class of module F3 is updated to include only case 4 in accordance with that value of i3. In block 1060, module F3 is called.

Module F3 (Table 3a) begins execution and the variable b is set equal to TWO and the static internal variable i3 is set equal to 0. The execution of module F3 continues up to the point that module F4 is called. Stub auditor a34.3 (FIG. 10) is called rather than module F4.

During block 1210 of stub auditor a34.3, unmarked case 4 in the current equivalence class of module F4 is selected. In block 1220, the current equivalence class of module F4 is not advanced since it only contains one case and execution is returned to module F3 with a module F4 return value of FAIL.

The execution of module F3 (Table 3a) is then completed and the return value of module F3 is FAIL in accordance with the program.

Figure 8:
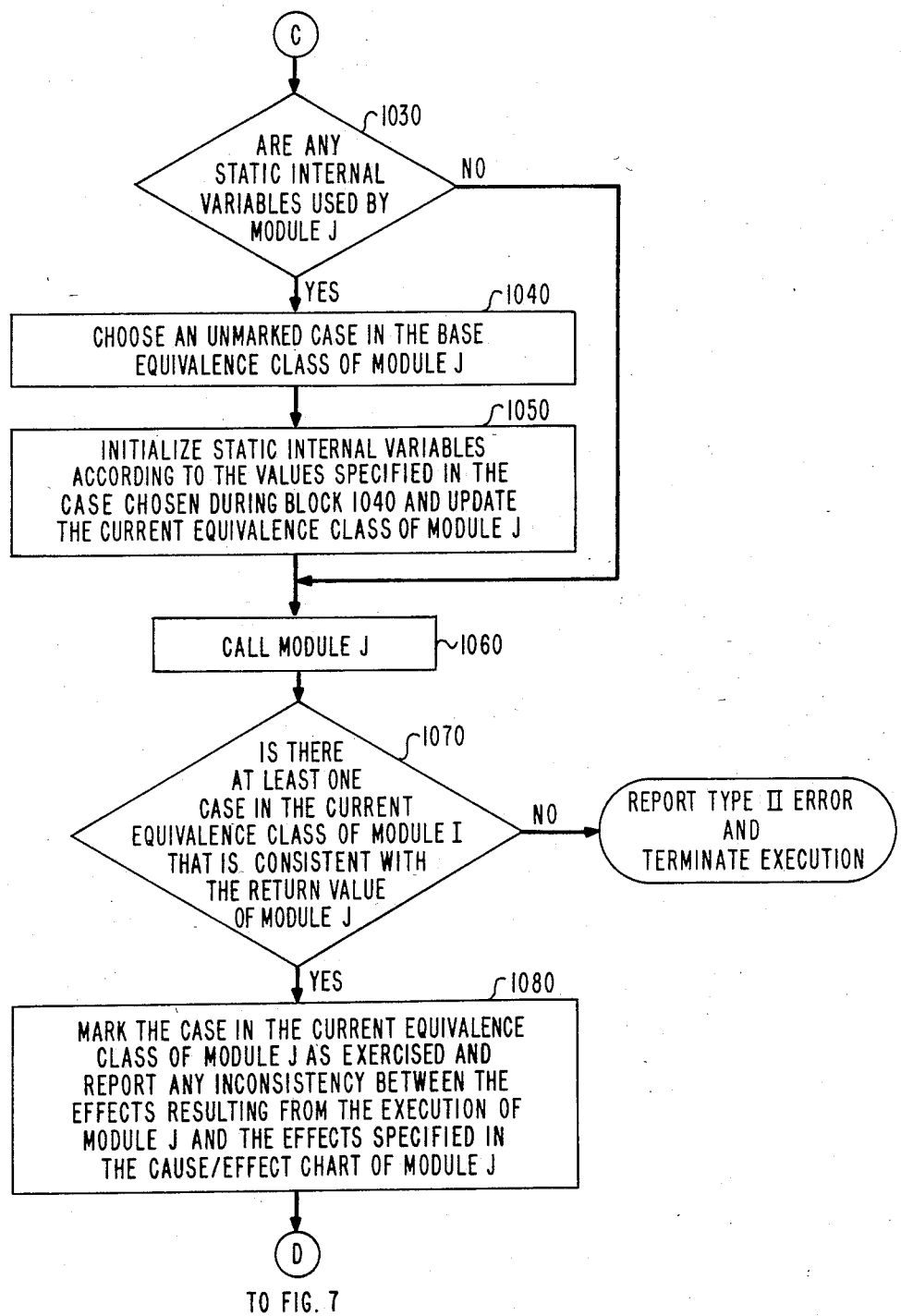

Execution is returned to block 1070 of the calling auditor a13.2 (FIGS. 7 and 8). Since case 3 in the current equivalence class of module F1 is consistent with a module F3 return value of FAIL, execution proceeds to block 1080 and case 4 of module F3 is marked as exercised. Execution proceeds back to block 1020 and, since cases 5 and 6 of module F3 are still unmarked, blocks 1030, 1040, 1050 and 1060 are thereafter executed. In block 1040, case 5 of module F3 is selected and in block 1050, the static internal variable i3 is initialized to 0 and the current equivalence class of module F3 is advanced to include cases 5 and 6, based on the value of i3. In block 1060, module F3 is called.

The execution of module F3 (Table 3a) begins and, since the static internal variable i3 is 0, execution continues up to the point that module F5 is called. In accordance with the method of the invention, auditor a35.2 is called rather than module F5.

In block 1010 of auditor a35.2 (FIGS. 7 and 8), the base equivalence class of module F5 is determined to include cases 4, 5 and 6 based on the value of TWO for the argument b (Table 4b). Since none of those cases has yet been exercised, execution proceeds through blocks 1020, 1030, 1040, 1050 and 1060. Case 4 of module F5 is selected during block 1040 and the static internal variable i5 is initialized to 0 and the current equivalence class of module F5 is advanced to include only case 4 in block 1050. In block 1060, module F5 is called.

Module F5 (Table 4a) is executed to completion. The variable b is incremented once and the variable i5 is set equal to 1. The module F5 return value is SUCCESS. These effects are consistent with case 4 in the cause/effect chart of module F5.

Execution resumes with block 1070 of the calling auditor a35.2 (FIGS. 7 and 8). The module F5 return value of SUCCESS is consistent with both cases 5 and 6 in the current equivalence class of module F3. Therefore, execution proceeds to block 1080 and case 4 of module F5 is marked as exercised. Execution proceeds back to block 1020. Since cases 5 and 6 in the base equivalence class of module F5 have not been exercised, execution proceeds through blocks 1030, 1040, 1050 and 1060. Case 5 of module F5 is selected during block 1040 and the static internal variable i5 is initialized to 1 and the current equivalence class of module F5 is advanced to include only case 5 in block 1050. In block 1060, module F5 is called.

Module F5 (Table 4a) is again executed to completion. The variable b is incremented once and the variable i5 is set equal to 2. The module F5 return value is SUCCESS. These effects are consistent with case 5 in the cause/effect chart of module F5.

Execution resumes with block 1070 of the calling auditor a35.2 (FIGS. 7 and 8). The module F5 return value of SUCCESS is consistent with both cases 5 and 6 in the current equivalence class of module F3. Therefore, execution proceeds to block 1080 and case 5 of module F5 is marked as exercised. Execution proceeds back to block 1020. Since case 6 in the base equivalence class of module F5 has not been exercised, execution proceeds through blocks 1030, 1040, 1050 and 1060. Case 6 of module F5 is selected during block 1040 and the static internal variable i5 is initialized to 2 and the current equivalence class of module F5 is advanced to include only case 6 in block 1050. In block 1060, module F5 is called.

Module F5 (Table 4a) is executed to completion. The variable b is incremented once and the variable i5 is set equal to 0. The module F5 return value is SUCCESS. These effects are consistent with case 6 in the cause/effect chart of module F5.

Execution resumes with block 1070 of the calling auditor a35.2 (FIGS. 7 and 8). The module F5 return value of SUCCESS is consistent with both cases 5 and 6 in the current equivalence class of module F3. Therefore, execution proceeds to block 1080 and case 6 of module F5 is marked as exercised. Execution proceeds back to block 1020. Since all the cases 4, 5 and 6 in the base equivalence class of module F5 have now been exercised, execution branches to block 1100. The module F5 return value of SUCCESS as in each of the cases 4, 5 and 6 in the base equivalence class of module F5 is consistent with both of the unmarked cases 5 and 6 in the current equivalence class of module F3. Therefore, execution continues to block 1110 wherein case 5 of module F3 is selected. The current equivalence class of module F3 is not advanced since both cases 5 and 6 thereof have a module F5 return value of SUCCESS. Execution is returned to module F3 with an F5 return value of SUCCESS.

The execution of module F3 (Table 3a) resumes from the point that module F5 was called and continues up to the point that module F4 is called. Since module F4 is a stub, stub auditor a34.4 (FIG. 10) is called.

In block 1210 of stub auditor a34.4, the unmarked case 5 of module F3, which has a module F4 return value of SUCCESS, is selected. In block 1220, the current equivalence class of module F3 is advanced to include only case 5 and execution is returned to module F3 with a module F4 return value of SUCCESS.

Module F3 (Table 3a) then executes to completion and, in accordance with its program, has a return value of SUCCESS. Execution is returned to the calling auditor a13.2.

The execution of auditor a13.2 (FIGS. 7 and 8) resumes with block 1070. Recall that the current equivalence class of module F1 comprises cases 3, 4 and 5. The module F3 return value of SUCCESS is consistent with cases 4 and 5 in the current equivalence class of module F1. Therefore execution proceeds to block 1080 and case 5 of module F3 is marked as exercised. Execution proceeds back to block 1020. Since case 6 of module F3 still has not been exercised, blocks 1030, 1040, 1050 and 1060 are again executed. The unmarked case 6 in the base equivalence class of module F3 is selected in block 1040. The static internal variable i3 is initialized to 0 and the current equivalence class of module F3 is updated to include cases 5 and 6 based on the value of i3 in block 1050. In block 1060, module F3 is called.

Execution of module F3 (Table 3a) begins and, since the variable i3 is 0, continues up to the point that module F5 is called. Auditor a35.3 is called rather than module F5.

In block 1010 of auditor a35.3 (FIGS. 7 and 8), it is determined that the base equivalence class of module F5 comprises cases 4, 5 and 6 based on the value of TWO for the variable b. However, since cases 4, 5 and 6 of module F5 have already been marked as exercised, they are not reexecuted and execution proceeds from block 1020 to block 1100. The one unmarked case in the current equivalence class of module F3, case 6, is consistent with a module F5 return value of SUCCESS as in each of the cases 4, 5 and 6 of the base equivalence class of module F5. Therefore execution proceeds to block 1110. The current equivalence class of module F3 is advanced to include only case 6 during block 1110 and execution is returned to module F3 with a module F5 return value of SUCCESS.

Module F3 (Table 3a) resumes execution and continues up to the point that module F4 is called. Stub auditor a34.5 (FIG. 10) is called rather module F4.

During block 1210 of stub auditor a34.5, case 6 of module F3 is selected since it is the only case in the current equivalence class of module F3 and it is unmarked. Case 6 in the cause/effect chart of module F3 specifies a module F4 return value of FAIL. In block 1220, the current equivalence class of module F3 need not be advanced and execution is returned to module F3 with a module F4 return value of FAIL.

The execution of module F3 (Table 3a) is resumed and completed. Based on the program of module F3, the return value of module F3 is FAIL. Execution is returned to the calling auditor a13.2.

The execution of auditor a13.2 (FIGS. 7 and 8) resumes with block 1070. Case 3 in the current equivalence class of module F1 is consistent with a module F3 return value of FAIL. Therefore execution continues to block 1080 wherein case 6 of module F3 is marked as exercised. Execution proceeds back to block 1020. This time all the cases 4, 5 and 6 in the base equivalence class of module F3 have been marked as exercised. Therefore execution branches to block 1100. At this point, all the cases 3, 4 and 5 in the current equivalence class of module F1 are unmarked. Case 3 of module F1 is consistent with a module F3 return value of FAIL as in cases 4 and 6 of the base equivalence class of module F3. Cases 4 and 5 of module F1 are both consistent with a module F3 return value of SUCCESS as in case 5 of the base equivalence class of module F3. Therefore execution continues to block 1110. In accordance with this example, case 3 of module F1 is selected and the current equivalence class of module F1 is advanced to include only case 3 in block 1110. Execution is returned to module F1 with a module F3 return value of FAIL.

Module F1 (Table 1a) executes to completion and, in accordance with its program, has a return value of FAIL.

Execution is returned to block 950 of the initial auditor ia.0 (FIG. 9) wherein case 3 of module F1 is marked as exercised. Execution proceeds back to block 910. Since cases 4 and 5 are still unmarked, execution continues to block 920 and case 4 is selected and the arguments a, b and c are set to ONE, TWO and THREE, respectively. In block 930, the current equivalence class of module F1 comprising cases 3, 4 and 5 is determined. Then in block 940, module F1 is called.

Module F1 (Table 1a) begins execution up to the point that module F3 is called and passed the value of TWO for the argument b. Auditor a13.3 is called rather than module F3.

In block 1010 of auditor a13.3 (FIGS. 7 and 8) it is determined that the base equivalence class of module F3 comprises cases 4, 5 and 6 based on the value of the argument b (Table 3b). Since each of those cases has already been marked as exercised, execution proceeds from block 1020 to block 1100. The unmarked cases in the current equivalence class of module F1 are, at this point, cases 4 and 5. Both of those cases are consistent with a module F3 return value of SUCCESS as in case 5 of the base equivalence class of module F3. Therefore execution proceeds to block 1110. Case 4 of module F1 is selected but the current equivalence class of module F1 is not advanced since both cases 4 and 5 have module F3 return values of SUCCESS. Execution is returned to module F1 with a module F3 return value of SUCCESS.

Module F1 (Table 1a) resumes execution up to the point that module F2 is called and passed the values of the arguments a, b and c. Auditor a12.1 is called rather module F2.

In block 1010 of auditor a12.1 (FIGS. 7 and 8) it is determined that the base equivalence class of module F2 comprises only case 1 based on the values of the arguments a, b and c (Table 2b). Since case 1 of module F2 has not been exercised and since module F2 does not use any static internal variables, execution proceeds through blocks 1020, 1030 and 1060. In block 1060, module F2 is called.

Module F2 (Table 2a) executes to completion and, in accordance with its program, has a return value of SUCCESS. Execution is returned to the calling auditor a12.1.

Auditor a12.1 (FIGS. 7 and 8) resumes execution with block 1070. Case 5 in the current equivalence class of module F1 is consistent with a module F2 return value of SUCCESS. Therefore, execution proceeds to block 1080 and case 1 of module F2 is marked as exercised. Execution proceeds back to block 1020. Since the only case in the base equivalence class of module F2, case 1, has been exercised, execution proceeds from block 1020 to block 1100. Unmarked case 5 of the current equivalence class of module F1 is consistent with a module F2 return value of SUCCESS. Therefore, execution proceeds to block 1110. The current equivalence class of module F1 is advanced to include only case 5 in block 1110 and execution is returned to module F1 with a module F2 return value of SUCCESS.

The execution of module F1 (Table 1a) resumes and continues to completion. In accordance with the program of module F1, the return value of module F1 is SUCCESS, which is consistent with the effect in case 5 of the cause/effect chart of module F1.

Execution returns to block 950 of the initial auditor ia.0 (FIG. 9) and case 5 of module F1 is marked as exercised. This completes the testing of the interfaces between modules. The continued execution of the initial auditor ia.0 results in the testing of the individual cases 3, 4 and 5 of module F2 and case 7 of module F5. Case 4 of module F1 cannot be tested since module F2 returns the value SUCCESS when the arguments a, b and c are equal to ONE, TWO and THREE, respectively. This may be due to an interface error between modules F1 and F2. It may also result if module F2 is to be called by other program modules not included as part of the present test.

Generalizations of the Method

An external variable is referred to as a live variable with respect to a program module J if: (1) it is used by a program module that transitively calls module J, i.e., it is either used by a module that calls module J directly or it is used by some higher-level module the execution of which results in the calling of module J, (2) it is not used by module J and (3) it used by some module transitively called by module J, i.e., it is either used by a module called directly by module J or by a lower-level module which is called as a result of the execution of module J. The auditors described thus far do not sufficiently test the interfaces between program modules having live variables.

One approach to testing modules with live variables involves only a slight modification to the program of the auditor described above with reference to FIGS. 1 and 2. First, the live variables of each program module are determined using a method such as that disclosed in the article, "A Program Data Flow Analysis Procedure" by F. E. Allen and J. Cocke, *Communications of the ACM*, 1976. Thereafter a table referred to as a live variable table is maintained for each program module. Each time a module is called, the values of the live variables are stored in the live variable table for that module if those values are not already present in that table. Any cases in the base equivalence class of the module that had been previously marked as exercised are marked as not exercised and executed again using the new values of the live variables. A portion of the flow chart for an exemplary generalized auditor g1aIJ is shown in FIG. 12. The auditor is inserted between a calling module I and a called module J, the called module J having live variables. Execution begins with block 5010 during which the base equivalence class of module J is determined. Assuming such base equivalence class exists, execution continues to block 5011. In block 5011 it is determined whether the present values of the live variables of module J are in the live variable table of module J. Of course, the first time the auditor is executed, nothing is present in the live variable table and execution proceeds to block 5012 wherein all the cases in the base equivalence class of module J are marked as not exercised. (Since this is the first time that the auditor is being exercised, none of the cases had been marked as exercised as yet.) In block 5013, the values of the live variables of module J are entered in the live variable table and execution continues to block 5015 during which the values of the external variables, including the live variables, are stored. The balance of the program of the generalized auditor g1aIJ is identical to that represented by the blocks 4020 and beyond of the auditor of FIGS. 1 and 2 and is therefore not repeated in FIG. 12. In accordance with that program, all the cases of the base equivalence class of module J are executed and marked as exercised. The next time that module I calls module J defining that base equivalence class, if the live variables of module J have different values, the execution of blocks 5011, 5012 and 5013 will result in the cases in the base equivalence class of module J being unmarked and the new live variable values being entered in the live variable table. Therefore when the balance of the auditor program is executed, those cases in the base equivalence class of module J will be exercised again with the new live variable values.

A second generalized auditor g2aIJ is based on another approach. This approach makes use of an expanded base equivalence class defined as the set of cases in the cause/effect chart of a called module J that are consistent with the values of all module J input variables at the time module J is called except the module J input variables that are live variables with respect to the calling module I. When module I calls module J, all the cases in the expanded base equivalence class of module J are exercised. The method makes use of two tables, referred to herein as the A-table and the B-table, to keep track of the live variable values. Each case in the cause/effect chart of a module that has live variables has an associated B-table which lists all the values of those live variables that have been anticipated throughout the execution of that case. Each current equivalence class of a module that has live variables has an associated A-table which lists all the values of those live variables that have been anticipated for each module called during the execution of the cases in that current equivalence class. For example, assume that a module W calls modules X, Y and Z as shown in FIG. 13 and that module W has live variables m1, m2 and m3 which are not modified by the modules X, Y and Z. Assume that some current equivalence class of module W has been defined and that module W calls module X and the live variables m1, m2 and m3 have the values 0, 2 and 1, respectively. The expanded base equivalence class of module X may include three cases, for example, wherein the variables (m1,m2,m3) have the values (0,2,1), (1,9,6) and (2,6,8). All three of the cases in the expanded base equivalence class of module X are executed. Before execution is returned to module W, the live variable values are entered under module X in the A-table for the current equivalence class of module W (FIG. 14). This process is repeated when modules Y and Z are called. If module Z is the last module called by module W, after the execution of module Z the current equivalence class of module W includes only one case and the A-table for that current equivalence class is completed as shown in FIG. 14. The B-table for the one case in the current equivalence class of module W is then constructed by performing an intersection operation on the entries in the A-table. In accordance with the example, the values of the live variables (m1,m2,m3) of (0,2,1) and (1,9,6) are found under each of the modules X, Y and Z in the A-table. Therefore, the B-table for the one case in the current equivalence class of module W is constructed as shown in FIG. 15.

Figure 16:
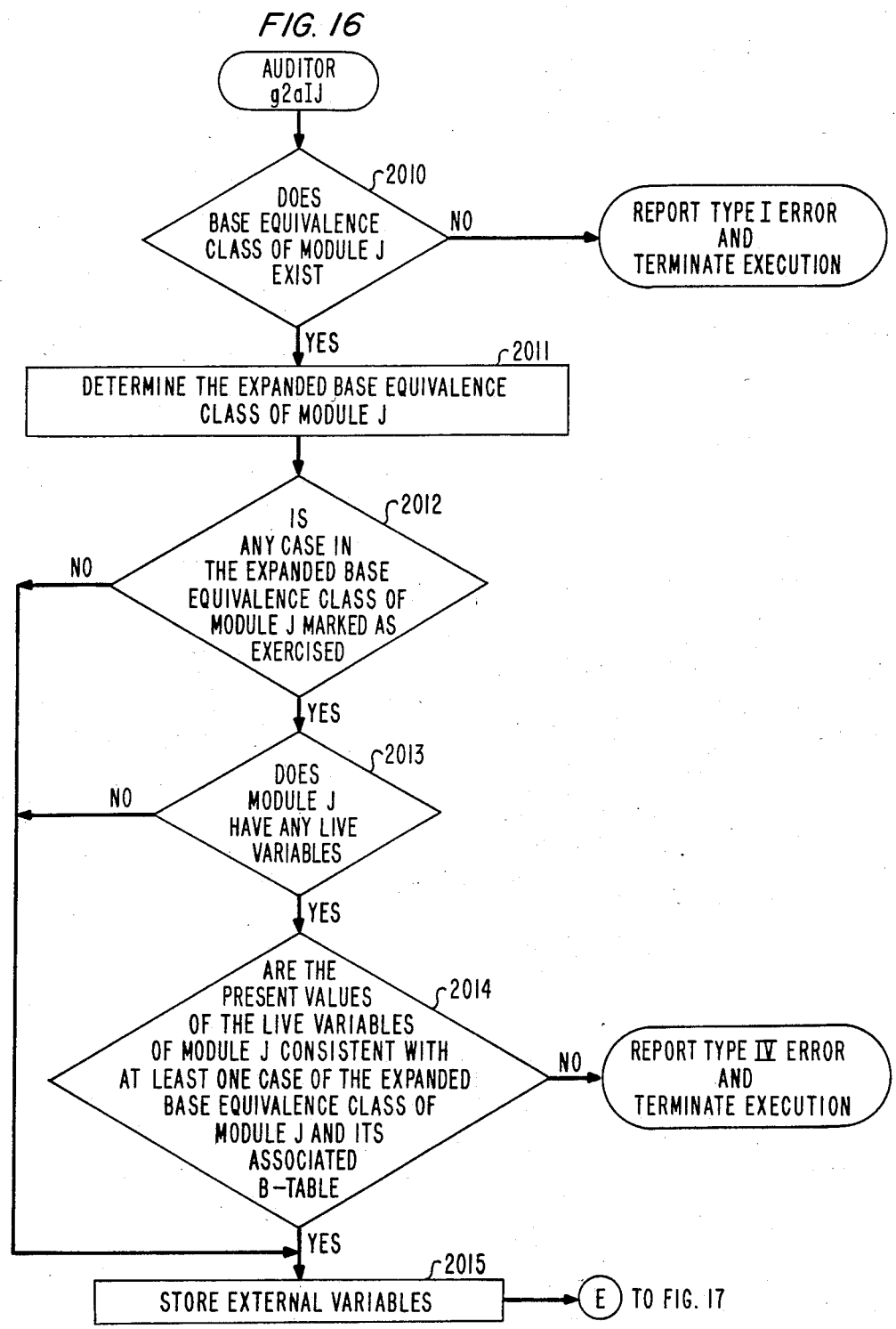
Figure 17:
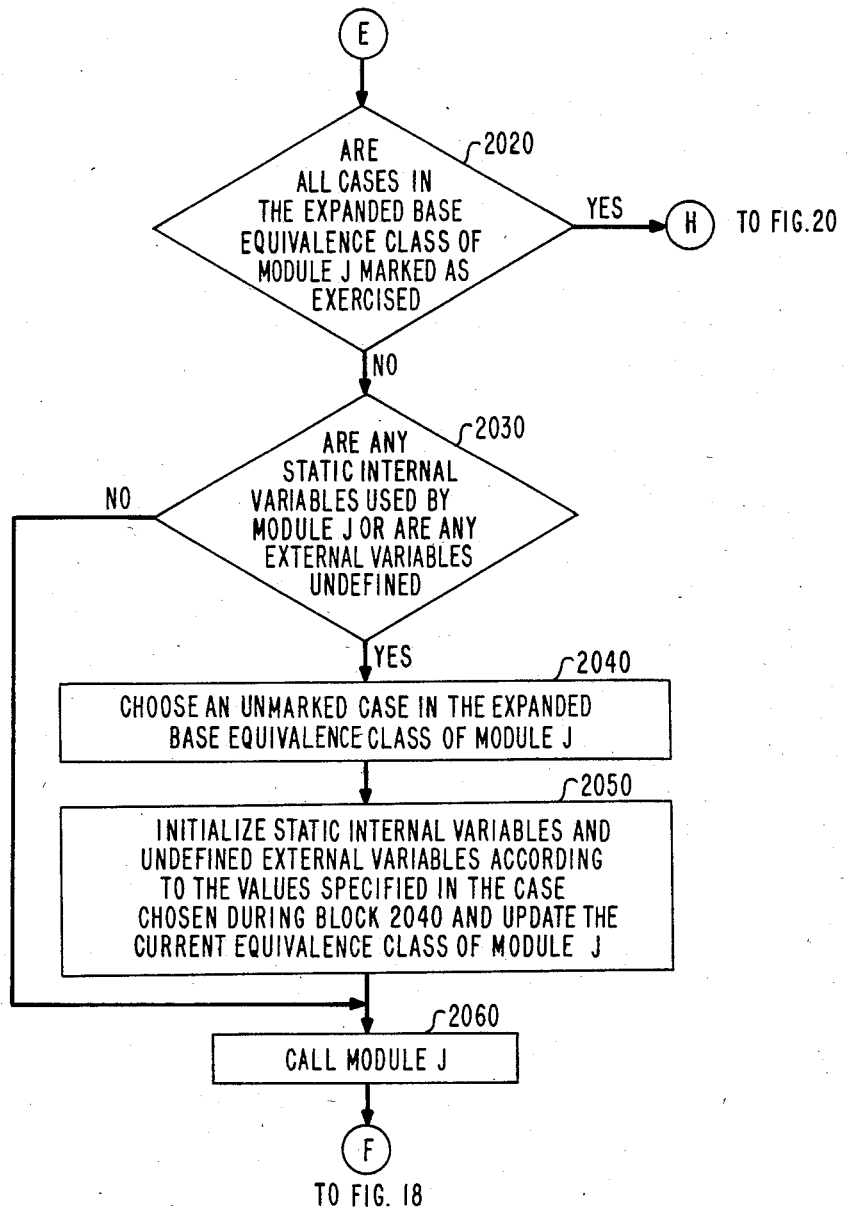
Figure 18:
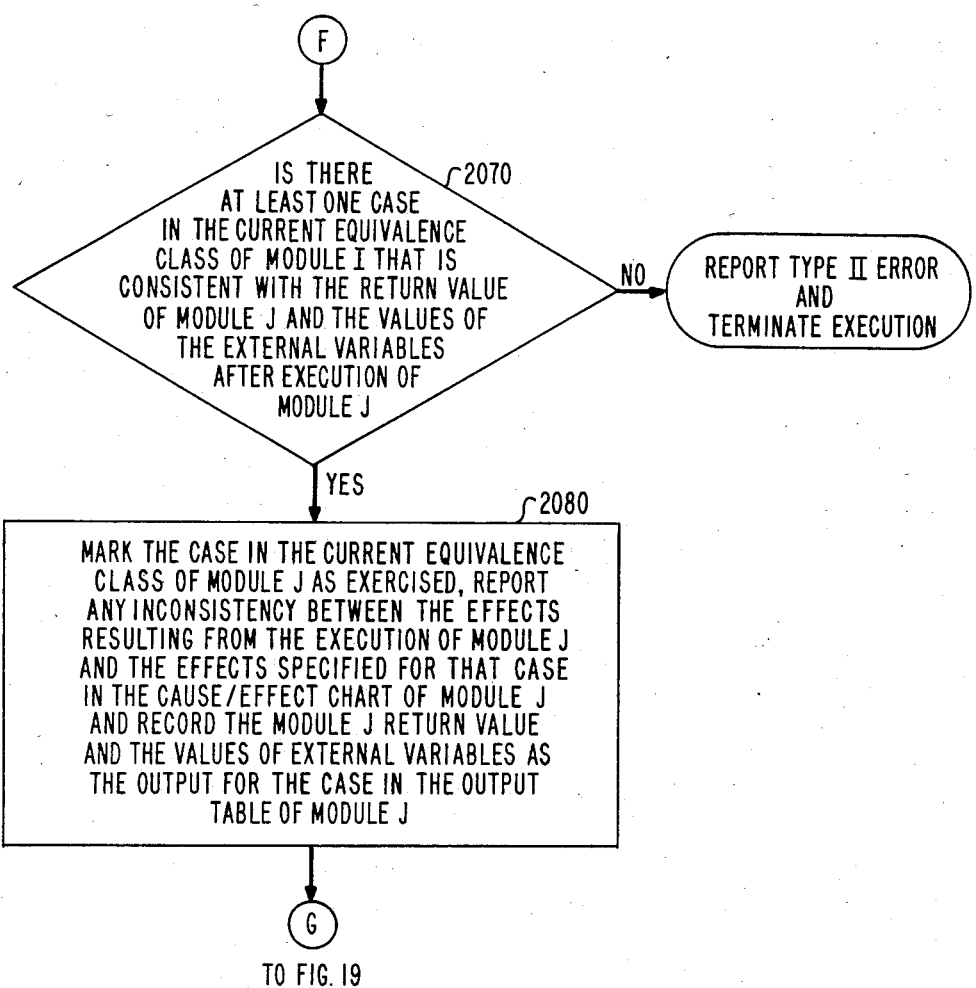
Figure 19:
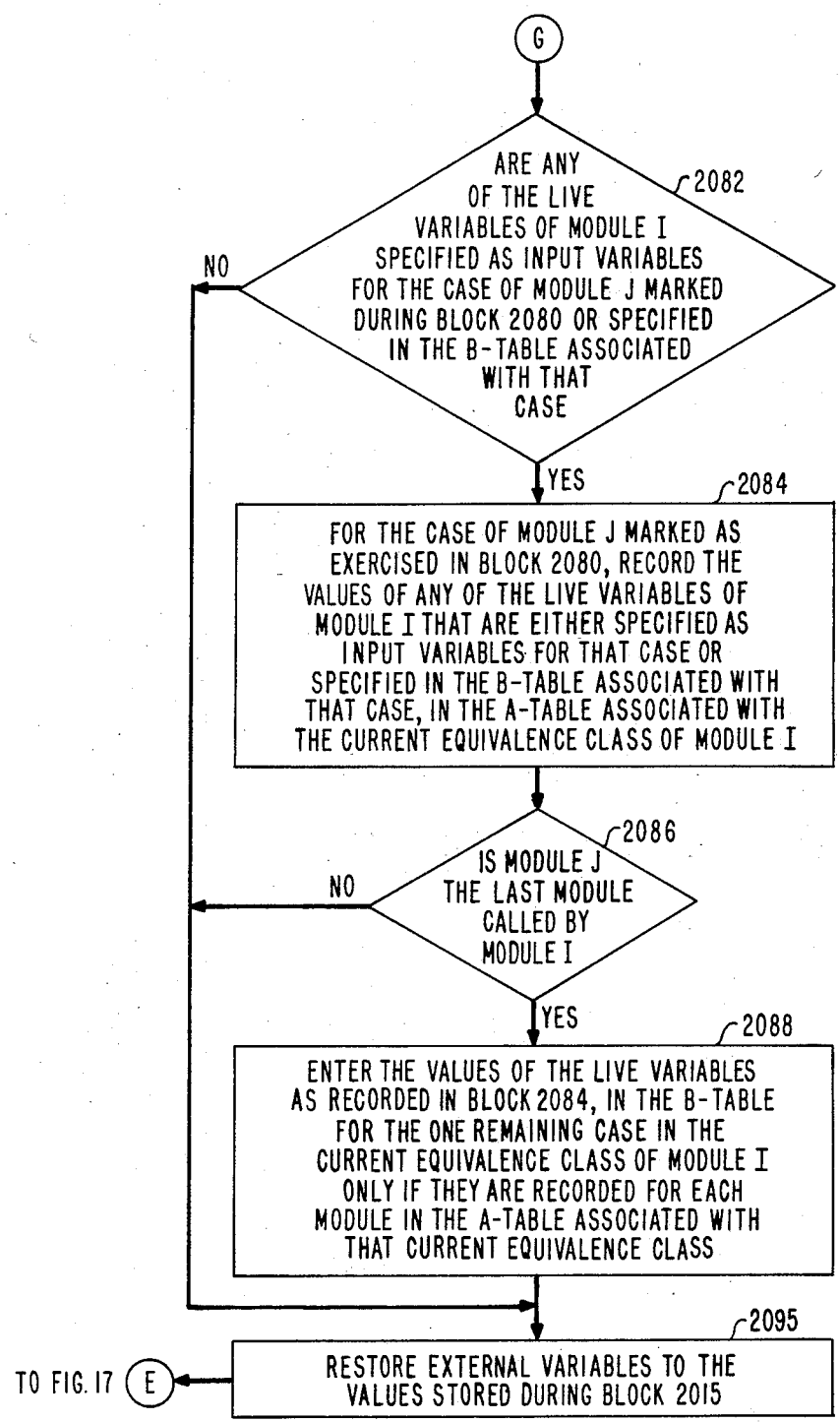
Figure 20:
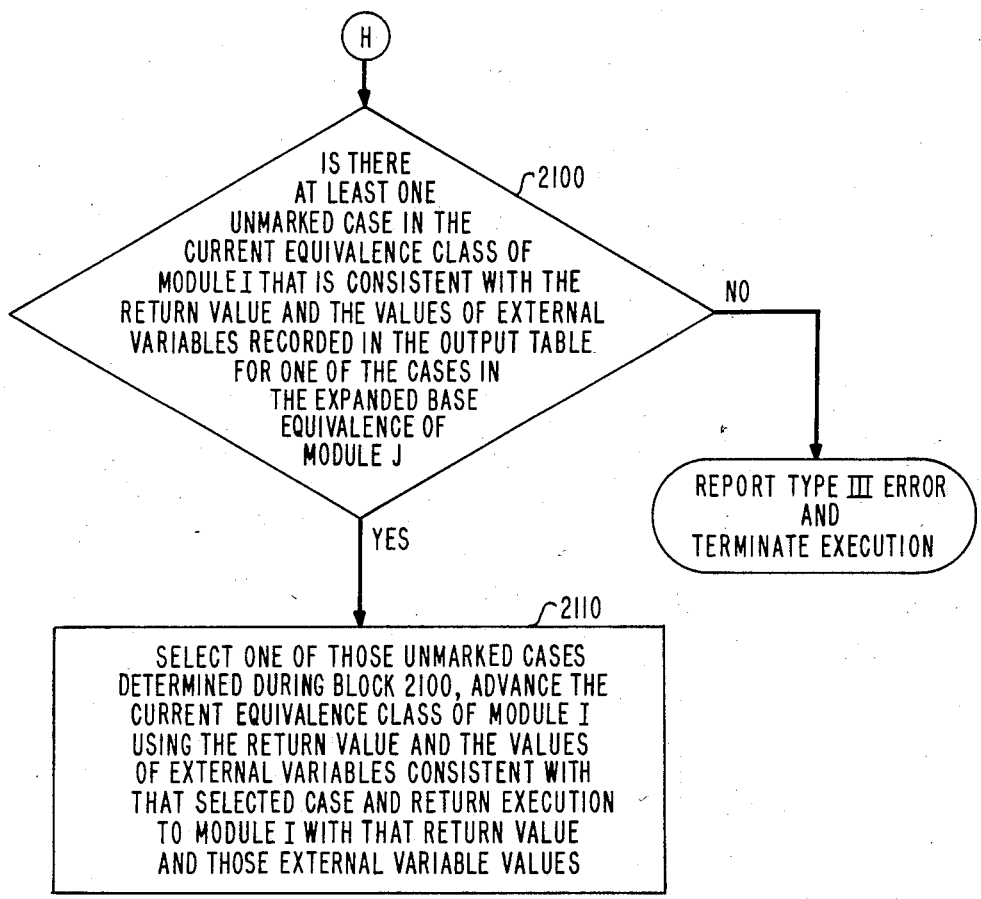

The flow chart for an exemplary generalized auditor g2aIJ is shown in FIGS. 16 through 18. The auditor g2aIJ is inserted between a calling module I and a called module J. Both module I and module J may have live variables. Execution begins with block 2010 wherein it is determined whether a base equivalence class of module J exists. If no such base equivalence class exists, a Type I error is reported indicating the incorrectness of the interface between module I and module J. Otherwise, execution continues to block 2011 and the expanded base equivalence class, defined above, of module J is determined. In block 2012, it is determined whether any case in the expanded base equivalence class of module J has been marked as exercised. If the auditor has been called before such that at least one of the cases in the expanded base equivalence class of module J has been previously exercised, execution proceeds to block 2013 and it is determined whether module J has any live variables. If so execution continues with block 2014 during which it is determined whether the present values of the live variables of module J are consistent with at least one case of the expanded base equivalence class of module J and its associated B-table. If not, the present values of the live variables of module J were not anticipated when the cases of the expanded base equivalence class of module J were previously executed. Therefore, a Type IV error is reported indicating the incorrectness of the interface between module I and module J and execution is terminated. If the present values of the live variables were anticipated, execution proceeds to block 2015. (Block 2015 is also reached directly from block 2012 or from block 2013 under the conditions indicated in the flow chart.) In block 2015, the values of all external variables, including live variables, are stored for future reference and execution proceeds to block 2020. In block 2020, it is determined whether all the cases in the expanded base equivalence class of module J have been marked as exercised. Assume now that the cases in the expanded base equivalence class of module J have not been marked as exercised. Therefore, in response to the determination of block 2020, execution proceeds to block 2030. If module J uses any static internal variables or if any external variables remain undefined, execution proceeds via blocks 2040 and 2050 to block 2060. Otherwise, execution proceeds directly to block 2060. In block 2040, an unmarked case in the base equivalence class of module J is selected. Then in block 2050, the values specified for the case selected during block 2040 are used to initialize static internal variables and previously undefined external variables. Accordingly, when block 2060 is reached by either path, all static internal variables and external variables that are module J input variables have been defined. In block 2060, module J is called.

Module J is executed to completion and execution returns to block 2070 of the auditor. In block 2070, it is determined whether there is at least one case in the current equivalence class of module I that is consistent with the return value of module J and the values of the external variables after the execution of module J. If no such case exists in the current equivalence class of module I, a Type II error is reported indicating that the interface between module I and module J is incorrect and execution of the auditor is terminated. If at least one such case is found, however, execution continues to block 2080. In block 2080, the one case remaining in the current equivalence class of module J is marked as exercised. Also during block 2080, any inconsistency between the effects resulting from the execution of module J and the effects specified for that case in the cause/effect chart of module J is reported indicating the incorrectness of module J. The recording of values in the output table of module J is also effected during block 2080 and execution continues to block 2082. In block 2082, it is determined whether any of the live variables of module I are specified as input variables for the case of module J marked during block 2080 or specified in the B-table associated with that case. If so, the values of such live variables are recorded in the A-table associated with the current equivalence class of module I during block 2084. In block 2086, it is determined whether module J is the last module called by module I. If so, execution proceeds to block 2088 and the values of the live variables recorded in block 2084 are entered in the B-table for the one remaining case in the current equivalence class of module I only if they are recorded for each module in the A-table for that current equivalence class. Execution then proceeds to block 2095 wherein the values of the external variables are all restored to the values stored in block 2015, including the indication of undefined status for any of the external variables that were undefined when block 2015 was executed. (Block 2095 can also be reached directly from blocks 2082 and 2086 under the conditions indicated in the flow chart.) Execution then proceeds back to block 2020 and the sequence just described is repeated once for each case in the expanded base equivalence class of module J as each case is exercised. If module J is the last module called by module I, after all the cases in the expanded base equivalence class of module J have been exercised, the B-table for the one remaining case in the current equivalence class of module I will have been completed. Execution then branches from block 2020 to block 2100. In block 2100, it is determined whether there is at least one unmarked case in the current equivalence class of module I that is consistent with the return value and the values of external variables recorded in the output table for one of the cases in the expanded base equivalence class of module J. If no such unmarked case can be found in the current equivalence class of module I, a Type III error is reported indicating the incorrectness of the interface between module I and module J and execution of the auditor is terminated. Otherwise, execution continues to block 2110 and one of the unmarked cases in the current equivalence class of module I that was determined during block 2100 is selected. The current equivalence class of module I is advanced using the module J return value and the values of external variables consistent with that selected case. Execution is then returned to the calling module I.

Since each case of each cause/effect chart need only be executed once, testing using the generalized auditor g2aIJ has the desirable property that the number of test executions is proportional to the sum of the numbers of cases in the cause/effect charts. Therefore, the testing of large programs remains practical.

It is to be understood that the above-described test methods are merely illustrative of the principles of the invention and that other methods may be devised by those skilled in the art without departing from the spirit and scope of the invention. For example, programming languages other than the C language and other decision table formalisms equivalent to the above-described cause/effect chart are contemplated. The invention is also applicable to the testing of integrated, recursive program modules.

What is claimed is:

1. A method of operating a digital computer to test an interface between a first program module and a second program module, each of said first and second program modules having associated input variables and an associated cause/effect chart comprising a plurality of cases each having an input condition comprising values of input variables, said method comprising
   initiating the execution of said first program module,
   suspending the execution of said first program module at a point where said first program module calls said second program module and
   verifying that the values of those input variables associated with said second program module that are defined at the time the execution of said first program module is suspended, are consistent with the input condition of at least one of the cases of the cause/effect chart associated with said second program module.

2. A method of operating a digital computer to test an interface between a first program module and a second program module, each of said first and second program modules having associated input variables and an associated cause/effect chart comprising a plurality of cases each having an input condition comprising values of input variables, said method comprising
   initiating the execution of said first program module,
   suspending the execution of said first program module at a point where said first program module calls said second program module,
   executing said second program module and
   verifying that the value of those input variables associated with said first program module that are defined at the time that the execution of said second program module is completed, are consistent with the input condition of at least one of the cases of the cause/effect chart associated with said first program module.

3. A method of testing an interface between a first program module and a second program module wherein said first program module, when executed on a digital computer, calls said second program module and wherein each of said first and second program modules has associated input variables and an associated cause/effect chart comprising a plurality of cases each having an input condition comprising values of input variables, said method comprising generating a first error indication upon a determination that the values of those input variables associated with said second program module that are defined at the time that said first program module calls said second program module, are not consistent with the input condition of any of the cases of the cause/effect chart associated with said second program module, executing said second program module and generating a second error indication upon a determination that the values of those input variables associated with said first program module that are defined at the time that the execution of said second program module is completed, are not consistent with the input condition of any of the cases of the cause/effect chart associated with said first program module.

4. A method of operating a digital computer to test an interface between a first program module and a second program module, each of said first and second program modules having associated input variables and an associated cause/effect chart comprising a plurality of cases each having an input condition comprising values of input variables, said method comprising storing said first program module and the cause/effect chart associated with said first program module, storing said second program module and the cause/effect chart associated with said second program module, initiating the execution of said first program module, suspending the execution of said first program module at a point where said first program module calls said second program module and generating a first error indication upon a determination that the values of those input variables associated with said second program module that are defined at the time that the execution of said first program module is suspended, are not consistent with the input condition of any of the cases of said stored cause/effect chart associated with said second program module.

5. A method in accordance with claim 4 further comprising executing said second program module and generating a second error indication upon a determination that the values of those input variables associated with said first program module that are defined at the time that the execution of said second program module is completed, are not consistent with the input condition of any of the cases of said stored cause/effect chart associated with said first program module.

6. A method of operating a digital computer to verify an interface between a first program module and a second program module, each of said first and second program modules having associated input variables and an associated cause/effect chart comprising a plurality of cases each having an input condition comprising values of input variables, said method comprising the steps of (A) storing said first program module and the cause/effect chart associated with said first program module, (B) storing said second program module and the cause/effect chart associated with said second program module, (C) initializing the input variables associated with said first program module that are arguments and the input variables associated with said first program module that are external variables, in accordance with the input condition of at least one unexecuted case in said stored cause/effect chart associated with said first program module, (D) initiating the execution of said first program module, (E) suspending the execution of said first program module at a point where said first program module calls said second program module and (F) verifying that the values of the input variables associated with said second program module that are defined at the time that the execution of said first program module is suspended, define a base equivalence class of cases in said stored cause/effect chart associated with said second program module.

7. A method in accordance with claim 6 further comprising the steps of (G) executing said second program module once for each case in said base equivalence class not previously executed, with the input variables associated with said second program module initialized in accordance with the input condition of that case, and (H) upon completion of each execution of said second program module in said step (G), verifying that the values of the input variables associated with said first program module that are then defined, are consistent with the input condition of at least one case in a current equivalence class of cases in said stored cause/effect chart associated with said first program module, said current equivalence class being defined by the values of the input variables associated with said first program module that are defined at the time that the execution of said first program module is suspended.

8. A method in accordance with claim 7 further comprising the steps of (I) upon completion of each execution of said second program module in said step (G), recording the values of the input variables associated with said first program module that are then defined and (J) verifying that the input condition of at least one unexecuted case in said current equivalence class is consistent with the values of the input variables associated with said first program module that were recorded in said step (I) following at least one of the executions of said second program module in said step (G).

9. A method in accordance with claim 8 further comprising the steps of (K) selecting one unexecuted case in said current equivalence class having an input condition that is consistent with the values of the input variables associated with said first program module that were recorded in said step (I) following at least one of the executions of said second program module in said step (G), (L) assigning to the input variables associated with said first program module, values consistent with the input condition of said selected case and (M) completing the execution of said first program module.

10. A method in accordance with claim 9 further comprising the step (N) repeating said steps (C), (D), (E), (F), (G), (H), (I), (J), (K), (L) and (M) until each case in said stored cause/effect chart associated with said first program module has been executed.

11. A method in accordance with claim 6 further comprising the steps of (G) determining an expanded base equivalence class of cases in said stored cause/effect chart associated with said second program module, said expanded base equivalence class being defined by the values of the input variables associated with said second program module that are defined at the time that the execution of said first program module is suspended but that are not live variables of said first program module, (H) executing said second program module once for each case in said expanded base equivalence class not previously executed, with the input variables associated with said second program module initialized in accordance with the input condition of that case, and (I) upon completion of each execution of said second program module in said step (H), verifying that the values of the input variables associated with said first program module that are then defined, are consistent with the input condition of at least one case in a current equivalence class of cases in said stored cause/effect chart associated with said first program module, said current equivalence class being defined by the values of the input variables associated with said first program module that are defined at the time that the execution of said first program module is suspended.

12. A method of operating a digital computer to verify an interface between a first program module and a second program module, each of said first and second program modules having associated input variables and an associated cause/effect chart comprising a plurality of cases each having an input condition comprising values of input variables, said method comprising the steps of (A) storing said first program module and the cause/effect chart associated with said first program module, (B) storing said second program module and the cause/effect chart associated with said second program module, (C) initializing the input variables associated with said first program module that are arguments and the input variables associated with said first program module that are external variables, in accordance with the input condition of at least one case that is marked as not exercised, of the cases in said stored cause/effect chart associated with said first program module, (D) initiating the execution of said first program module, (E) suspending the execution of said first program module at a point where said first program module calls said second program module and (F) verifying that the values of the input variables associated with said second program module that are defined at the time that the execution of said first program module is suspended, define a base equivalence class of cases in said stored cause/effect chart associated with said second program module.

13. A method in accordance with claim 12 further comprising the steps of (G) storing the present values of input variables associated with said second program module that are external variables and of input variables associated with any program module transitively called by said second program module that are external variables, (H) executing said second program module once for each case in said base equivalence class that is marked as not exercised, with the input variables associated with said second program module initialized in accordance with the input condition of that case, and (I) upon completion of each execution of said second program module in said step (H), verifying that the values of the input variables associated with said first program module that are then defined, are consistent with the input condition of at least one case in a current equivalence class of cases in said stored cause/effect chart associated with said first program module, said current equivalence class being defined by the values of the input variables associated with said first program module that are defined at the time that the execution of said first program module is suspended.

14. A method in accordance with claim 13 further comprising the steps of (J) upon completion of each execution of said second program module in said step (H), recording the values of the input variables associated with said first program module that are then defined, (K) upon completion of each execution of said second program module in said step (H), marking as exercised a case of said stored cause/effect chart associated with said second program module having an input condition that is consistent with the values of the input variables associated with said second program module as then defined, (L) upon completion of each execution of said second program module in said step (H), assigning the values stored in said step (G) to said input variables associated with said second program module that are external variables and said input variables associated with any program module transitively called by said second program module that are external variables and (M) verifying that the input condition of at least one case in said current equivalence class that is marked as not exercised, is consistent with the values of the input variables associated with said first program module that were recorded in said step (J) following at least one of the executions of said second program module in said step (H).

15. A method in accordance with claim 14 further comprising the steps of (N) selecting one case in said current equivalence class that is marked as not exercised and that has an input condition that is consistent with the values of the input variables associated with said first program module that were recorded in said step (J) following at least one of the executions of said second program module in said step (H), (O) assigning to the input variables associated with said first program module, values consistent with the input condition of said selected case, (P) completing the execution of said first program module and (Q) marking as exercised a case of said stored cause-/effect chart associated with said first program module having an input condition that is consistent with the values of the input variables associated with said first program module.

16. A method in accordance with claim 15 further comprising the step (R) repeating said steps (C), (D), (E), (F), (G), (H), (I), (J), (K), (L), (M), (N), (O), (P) and (Q) until each case in said stored cause/effect chart associated with said first program module has been marked as exercised.

17. A method in accordance with claim 16 wherein said second program module has a set of live variables, said method further comprising the step (O) before said storing step (G), marking as not exercised, at least one case in said stored cause/effect chart associated with said second program module, upon a determination that the values of said set of live variables following the present suspension of the execution of said first program module in said step (E), differ from the values of said set of live variables following previous suspensions of the execution of said first program module in said step (E).

18. A method in accordance with claim 16 wherein said second program module has a set of live variables, said method further comprising the steps of (O) after said verifying step (F) and upon a determination that the present values of said set of live variables differ from values of said set of live variables stored in a live variable table associated with said second program module, marking the cases of said base equivalence class defined in said step (F) as not exercised and (P) upon said determination that the present values of said set of live variables differ from values of said set of live variables stored in said live variable table associated with said second program module, storing the present values of said set of live variables in said live variable table associated with said second program module.

* * * * *